(12) United States Patent
Gupta et al.

(10) Patent No.: US 11,366,942 B2
(45) Date of Patent: Jun. 21, 2022

(54) QUADOR: QUADRIC-OF-REVOLUTION BEAMS FOR LATTICES

(71) Applicants: Siemens Corporation, Iselin, NJ (US); Georgia Tech Research Corporation, Atlanta, GA (US)

(72) Inventors: Ashish Gupta, Atlanta, GA (US); George Allen, Okinawa (JP); Jaroslaw Rossignac, Atlanta, GA (US); Suraj Ravi Musuvathy, Princeton Junction, NJ (US); Livio Dalloro, Plainsboro, NJ (US)

(73) Assignees: Siemens Corporation, Iselin, NJ (US); Georgia Tech Research Corporation, Atlanta, GA (US)

( * ) Notice: Subject to any disclaimer, the term of this patent is extended or adjusted under 35 U.S.C. 154(b) by 143 days.

(21) Appl. No.: 16/641,305

(22) PCT Filed: Sep. 4, 2018

(86) PCT No.: PCT/US2018/049356
§ 371 (c)(1),
(2) Date: Feb. 24, 2020

(87) PCT Pub. No.: WO2019/050842
PCT Pub. Date: Mar. 14, 2019

(65) Prior Publication Data
US 2020/0387647 A1 Dec. 10, 2020

Related U.S. Application Data

(60) Provisional application No. 62/555,884, filed on Sep. 8, 2017.

(51) Int. Cl.
*G06F 30/17* (2020.01)
*G06F 111/20* (2020.01)

(52) U.S. Cl.
CPC .......... *G06F 30/17* (2020.01); *G06F 2111/20* (2020.01)

(58) Field of Classification Search
CPC ....... G06F 30/00; G06F 30/17; G06F 2111/20
(Continued)

(56) References Cited

U.S. PATENT DOCUMENTS
2020/0387647 A1  12/2020  Gupta et al.

FOREIGN PATENT DOCUMENTS
EP  3662395 A1  6/2020
WO  2019050842 A1  3/2019

OTHER PUBLICATIONS

Jia, Jinyuan et al., "Computing Planar Sections of Surfaces of Revolution with Revolute Quadric Decomposition", 2004, Proceedings of the Shape Modeling International, IEEE. (Year: 2004).*
(Continued)

*Primary Examiner* — Cedric Johnson

(57) ABSTRACT

A computer-implemented method for constructing structures using beams bounded by quadric surfaces of revolution includes generating a quador beam within a computer-aided design (CAD) tool. The quador beam comprises two spheres at opposing endpoints, and the beam is bounded by a quadric surface of revolution around an axis of symmetry joining the center of the two spheres. The quadric surface of revolution abuts with tangent continuity with the surface of each of the spheres. Once generated, the quador beam can be visualized in the CAD tool or another display medium.

20 Claims, 22 Drawing Sheets

Cone Beams

Quador Beams

(58) Field of Classification Search
USPC .............................................................. 703/1
See application file for complete search history.

(56) References Cited

OTHER PUBLICATIONS

Amendola, A. et al., "Experimental Response of Addictively Manufactured Metallic Pentamode Materials Confined Between Stiffening Plates", Jan. 28, 2016, Composite Structures, Elsevier Ltd. (Year: 2016).*
International Search Report dated Dec. 5, 2018; Application No. PCT/US2018/049356; 14 pages.
Jia Jinyuan et al: "Revolute Quadric Decomposition of Canal Surfaces and Its Applications", May 22, 2005 (May 22, 2005), International Conference on Simulation, Modeling, and Programming for Autonomous Robots,Simpar 2010; [Lecture Notes in Computer Science; Lect.Notes Computer], Springer, Berlin, Heidelberg, pp. 298-305, XP047456584 / May 22, 2005.
Hongqing Wang et al: "A Hybrid Geometric Modeling Method for Large Scale Conformal Cellular Structures", Additive Manufacturing, vol. 2005, Sep. 28, 2005 (Sep. 28, 2005), pp. 421-427, XP055527050 / Sep. 28, 2005.
A. Amendola et al: "Experimental response of additively manufactured metallic pentamode materials confined between stiffening plates", Composite Structures, vol. 142, Jan. 28, 2016 (Jan. 28, 2016), pp. 254-262, XP055527218 / Jan. 28, 2016.
Canadian Examination Search Report dated Apr. 12, 2021; Application No. 3075177; 2 pages.

* cited by examiner

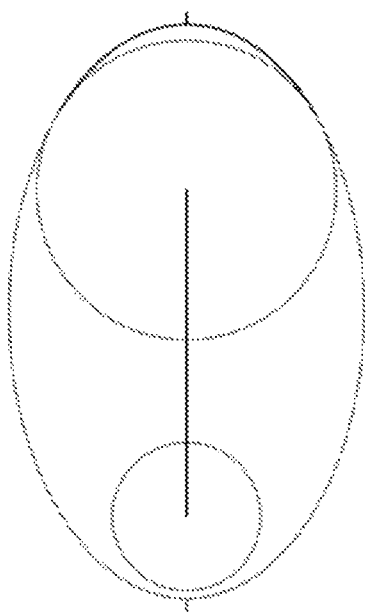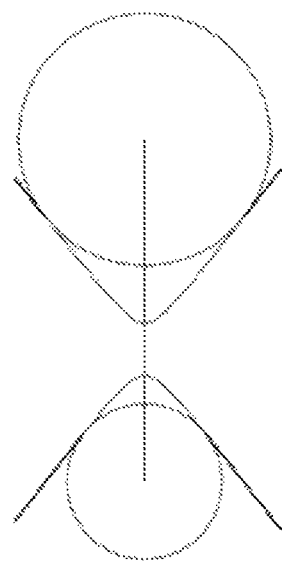
Fig. 3

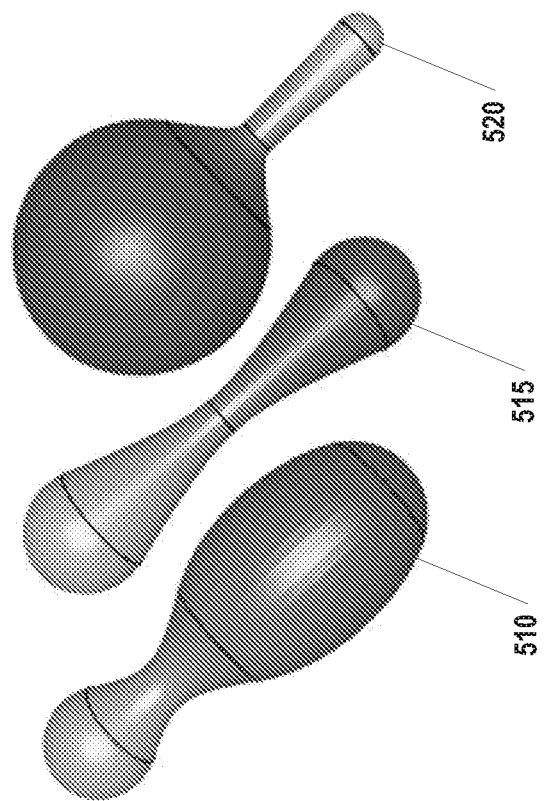
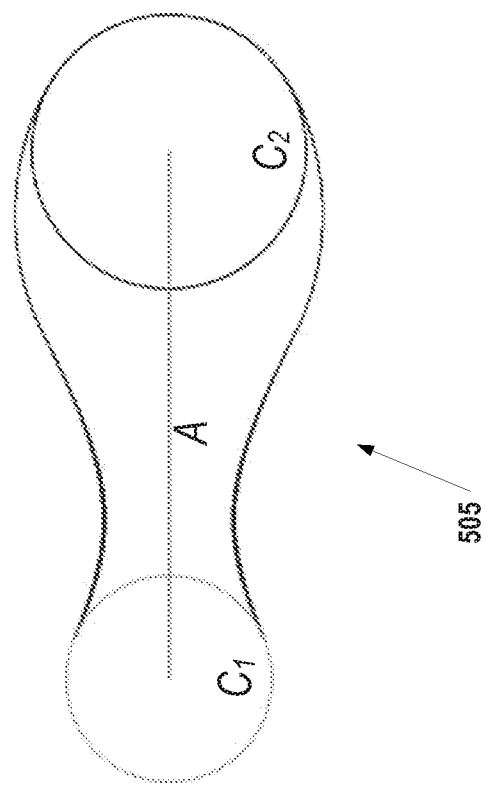
Fig. 5

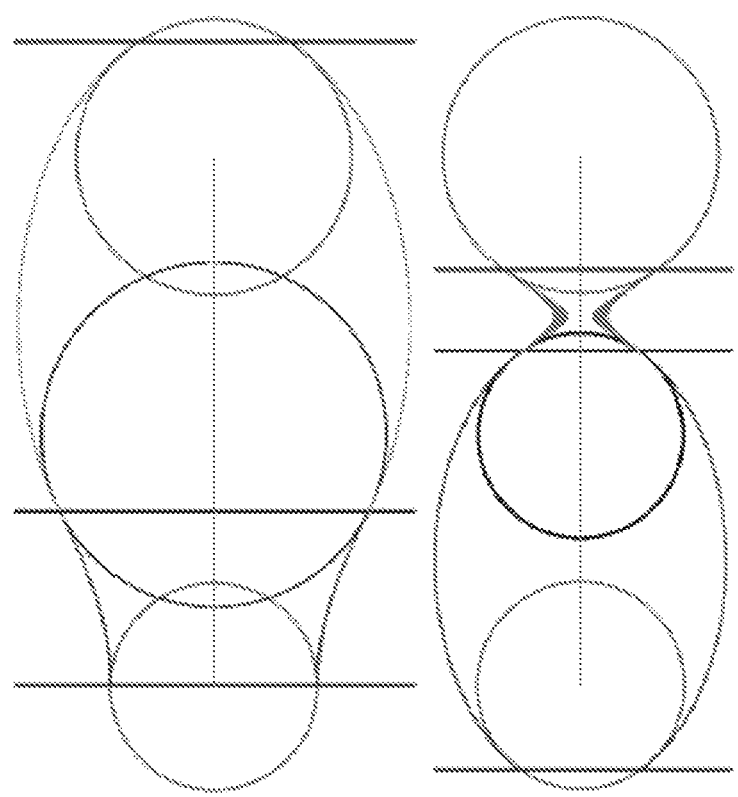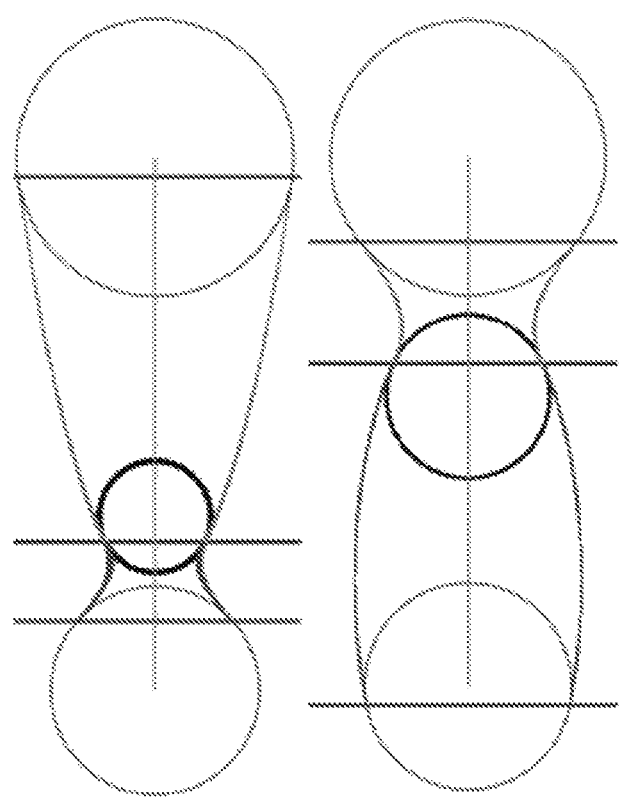
Fig. 7

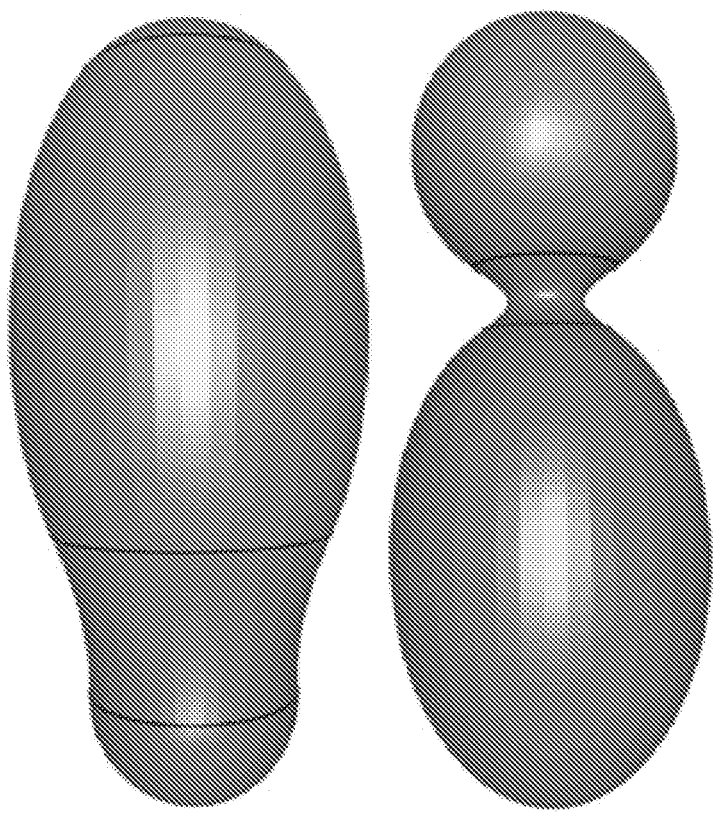
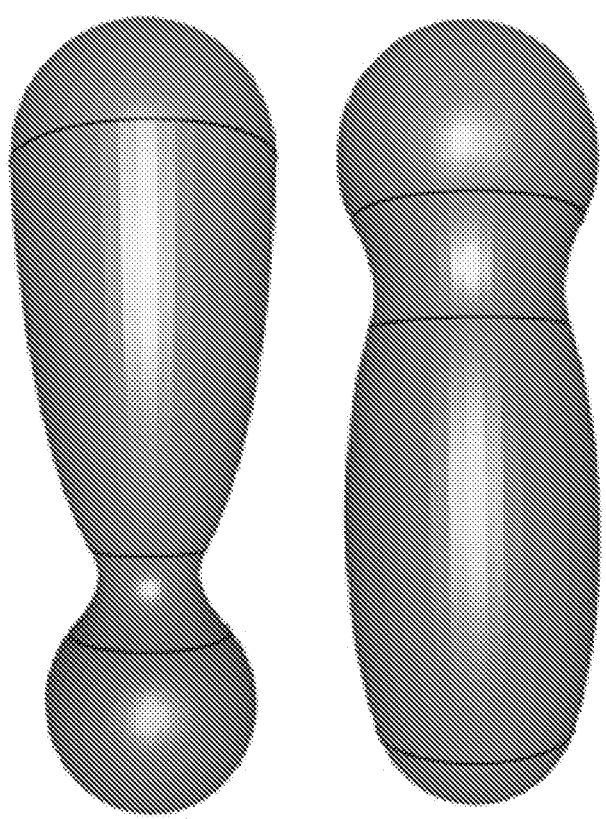
Fig. 8

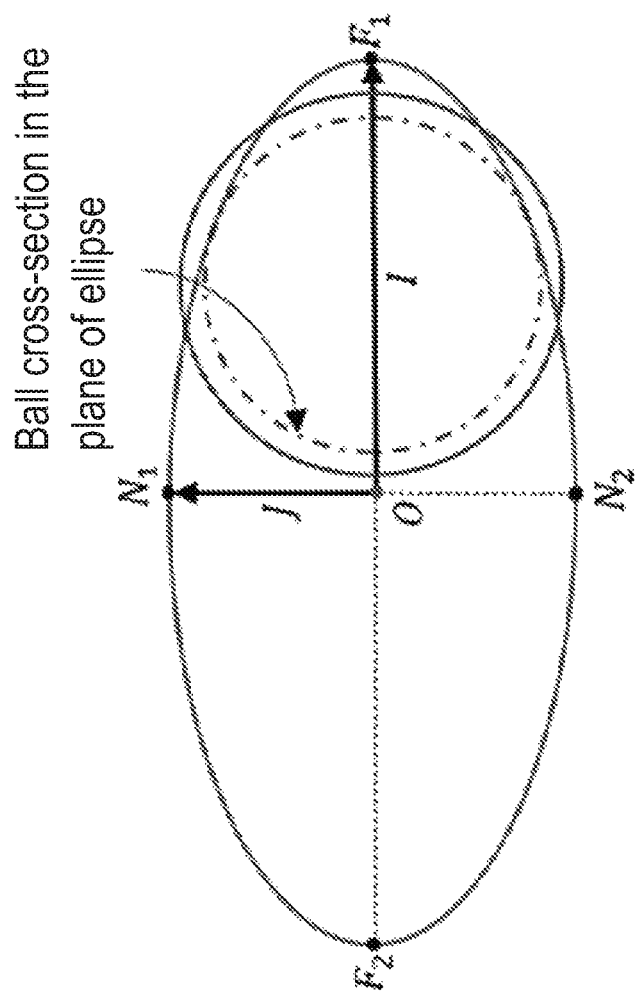
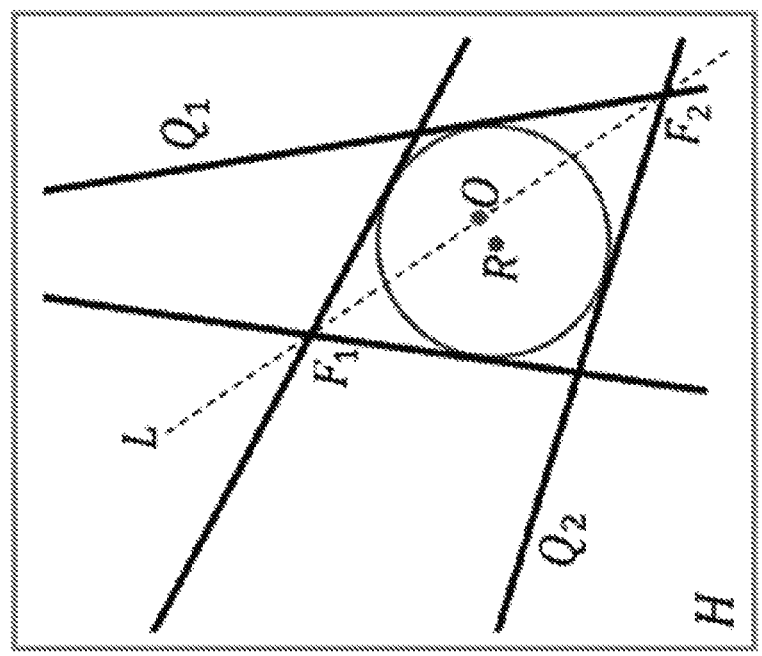
*Fig. 12*

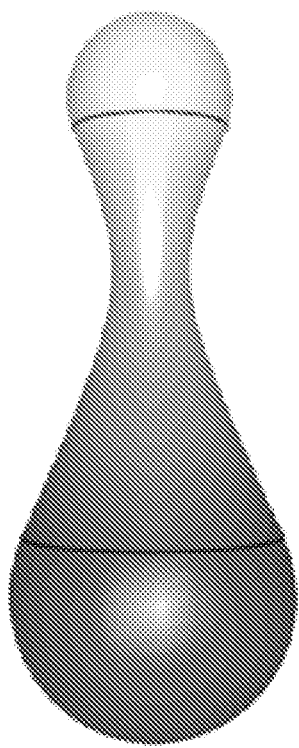
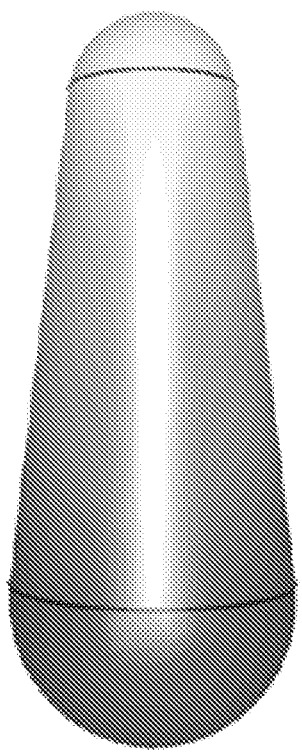
(b) Area/volume ≈ 0.110.
(a) Area/volume ≈ 0.073.
Fig. 19

QUADOR: QUADRIC-OF-REVOLUTION BEAMS FOR LATTICES

This application is a national phase filing under 35 U.S.C. § 371 of International Patent Application No. PCT/US2018/049356, filed Sep. 4, 2018, which claims the benefit of priority to U.S. Provisional Patent Application Ser. No. 62/555,884, filed Sep. 8, 2017, which are incorporated herein by reference in their entirety.

GOVERNMENT RIGHTS STATEMENT REGARDING FEDERALLY SPONSORED RESEARCH OR DEVELOPMENT

This invention was made with government support under HR0011-17-2-0015 awarded by National Science Foundation. The government has certain rights in the invention.

TECHNICAL FIELD

The present disclosure relates generally to methods, systems, and apparatuses related a geometric model for beams of a lattice structure that provides a compromise between shape flexibility, and ease and accuracy of computation. The disclosed techniques may be applied to, for example, the generation of lattice structures in additive manufacturing applications.

BACKGROUND

Architected materials comprise lattice structures that are often defined in terms of a set of spheres (or "balls") and beams that connect a pair of balls in the set. In several lattices, a beam connects to its balls tangentially. However, multiple beams can connect to the same ball and are not pairwise disjoint. The complexity and accuracy of the process of computing the boundary representation of the lattice, i.e. of the union of the balls and beams, depends on the shape of the beams. So do the many queries that must be performed on the lattice to support its usage in designing architected materials.

Conventional lattice generation practices either use simple beams (cylinders and cones) or use beams bounded by the surface of revolution of a circular or parabolic profile but accept the above-mentioned complexity and accuracy challenges. Thus, there is a need to find an effective compromise between, the flexibility of designing the beam's shape and the above-mentioned complexity and accuracy challenges.

SUMMARY

Embodiments of the present invention address and overcome one or more of the above shortcomings and drawbacks, by providing methods, systems, and apparatuses related to a geometric model for beams of a lattice structure that provides a compromise between shape flexibility, and ease and accuracy of computation. In its simplest embodiment, each beam is either a single quadric of revolution ("quador"), or two smoothly connected ones ("biquador"). Compared to beams supported in existing solutions or discussed in prior art, quador beams provide additional freedom in designing and optimizing lattice structures. One can design graded lattice structure by changing length, thickness and also the quadric profile of the beams, to improve factors such as strength to weight ratio, distribution of stresses, design desired physical behavior, and handling of buckling loads.

According to some embodiments, a computer-implemented method for constructing structures using beams bounded by quadric surfaces of revolution includes generating a quador beam within a computer-aided design (CAD) tool. The quador beam comprises two spheres at opposing endpoints, and the beam is bounded by a quadric surface of revolution around an axis of symmetry joining the center of the two spheres. The quadric surface of revolution abuts with tangent continuity with the surface of each of the spheres. Once generated, the quador beam can be visualized in the CAD tool or another display medium.

According to other embodiments, a computer-implemented method for constructing structures using beams bounded by quadric surfaces of revolution includes generating a plurality of quador beams within a CAD tool. A lattice is then constructed from a set of balls and the plurality of quador beams. Each quador beam connects an arbitrary pair of the balls. Once generated, the lattice can be displayed, for example, in the CAD tool. Also, in some embodiments, the lattice can be used to generate a structure printable by a 3D printer.

According to other embodiments, a computer-implemented method for constructing structures using beams bounded by a series of quadric surfaces of revolution includes generating a multi-quador beam within a CAD tool. The multi-quador beam comprises two spheres at opposing endpoints, and beam is bounded by a plurality of quadric surfaces of revolution around an axis of symmetry joining the center of the two spheres. The surface of the first sphere abuts with tangent continuity with the first surface in the series of quadric surfaces and the second sphere abuts with tangent continuity with the last surface in the series of quador surfaces. The plurality of quadric surfaces of revolution is smoothly connected with tangent continuity within each multi-quador beam. Once generated, the quador beam can be visualized in the CAD tool or another display medium.

According to other embodiments, a computer-implemented method for constructing structures using beams bounded by quadric surfaces of revolution includes generating a plurality of multi-quador beams within a CAD tool. A lattice is constructed from a set of balls and the plurality of multi-quador beams. Each multi-quador beam connects an arbitrary pair of the balls. Once generated, the lattice can be displayed, for example, in the CAD tool. Also, in some embodiments, the lattice can be used to generate a structure printable by a 3D printer.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 3 illustrates some example invalid profiles for making a quador;

FIG. 5 shows example biquador beams, according to some embodiments;

FIG. 7 shows several symmetric biconics of the same two circles;

FIG. 8 shows four example biquador beams defined with the same two balls;

FIG. 12 provides an example of computing the intersection curve between two quadors;

FIG. 19 provides a comparison of area/volume ratio;

DETAILED DESCRIPTION

Objects with designed internal structure often comprise a lattice of beams, in which the surface of each beam smoothly connects two spheres, possibly of different radii. Systems, methods, and apparatuses are described herein which relate generally to a geometric model for these beams that provides a compromise between shape flexibility and ease of computation. In its simplest embodiment, each beam is either a single quadric of revolution ("quador"), or two smoothly connected ones ("biquador"). As described in further detail below, using the techniques described herein, quador and biquador beams can be specified using easily adjustable parameters. They simplify and accelerate several common geometric queries, including point classification, ray casting, planar slicing, and boundary evaluation.

Figure 2A:
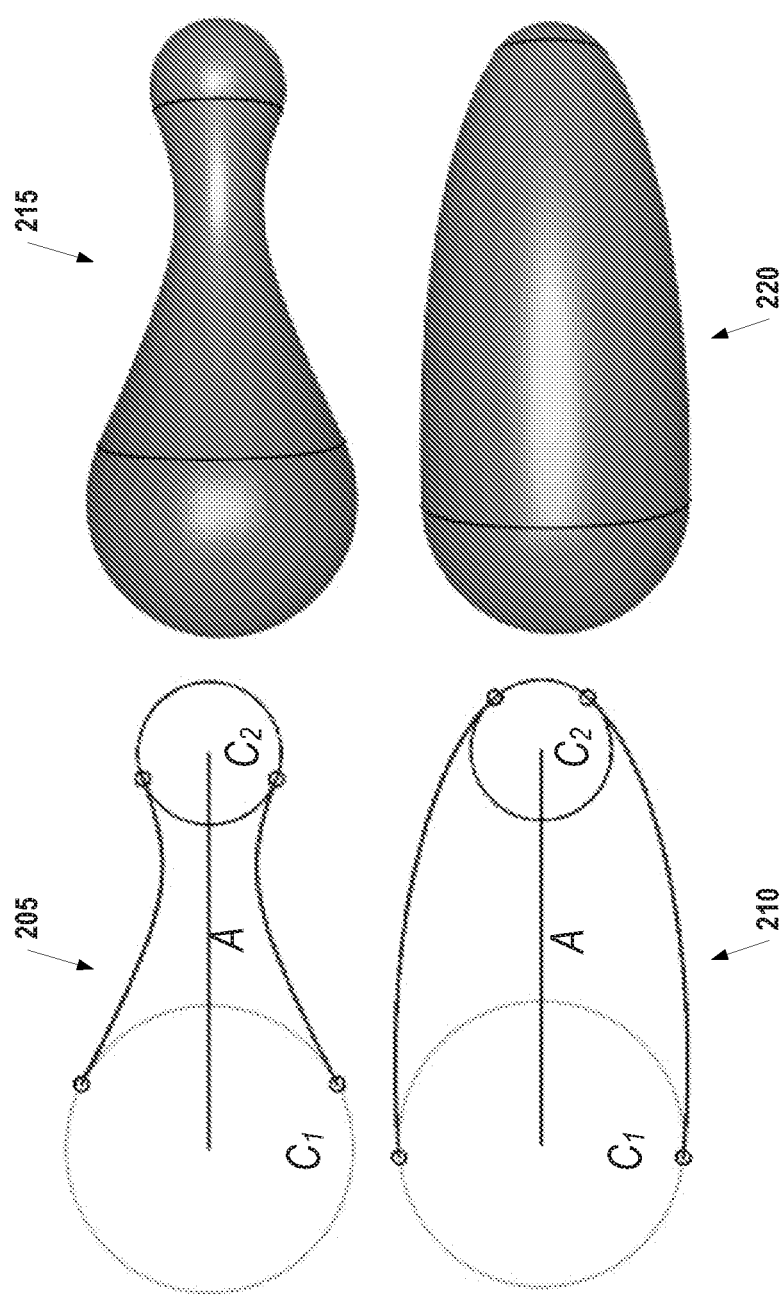
FIG. 2A provides example quador beams, according to some embodiments.
Figure 2B:
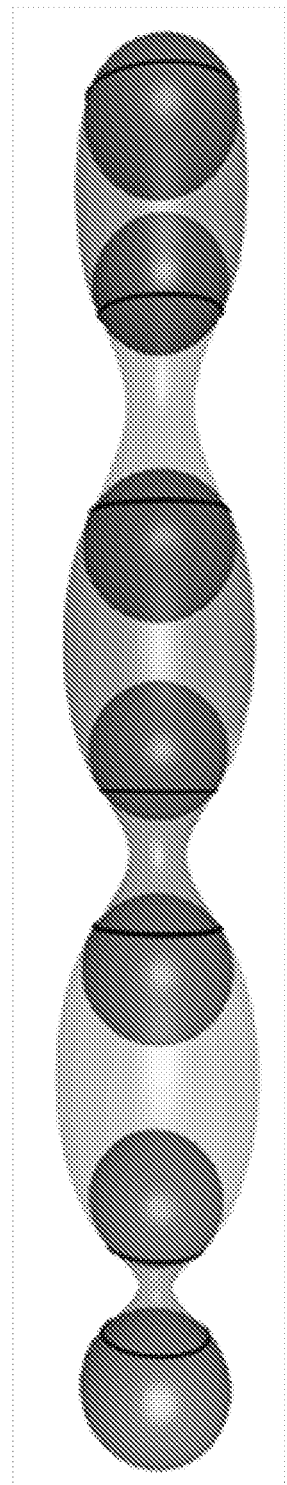
FIG. 2B provides an example of a multi-quador beam, according to some embodiments.

Briefly, given two circles (one not containing the other) in a plane, one can create a parametrized family of conic (quadric) profiles that are tangent to the two circles and are axis symmetric about the line joining the circle's centers. Then, a 3D beam can be created as a surface of revolution using the quadric profile and the axis of symmetry described above. We call these beams quador beams. The two circles can be replaced with two balls of corresponding center and radii and the surface of revolution created above will be tangent to these two balls. The proposed construction guarantees that any two quador beams connecting to the same ball will intersect in a plane along a conic curve. This property can be exploited to increase the efficiency and accuracy of the boundary evaluation process and of various queries that must be performed on such structures. In some embodiments, the quador beam may be extended to create bi-quador beams. These beams are defined by a profile curve that joins two tangent continuous quadric profiles, computed using two end balls and a middle ball to control the shape and location of merger of the two quadric profiles. FIG. 2A shows two example quador beams, according to some embodiments. In other embodiments, the quador beam definition can be extended to create multi-quador beams. These beams are defined by a sequence of connected quadric profiles, computed using two end spheres and a sequence of middle spheres to control the shape and location of merger of two consecutive profiles. FIG. 2B provides an example of a multi-quador beam, according to some embodiments.

Figure 1:
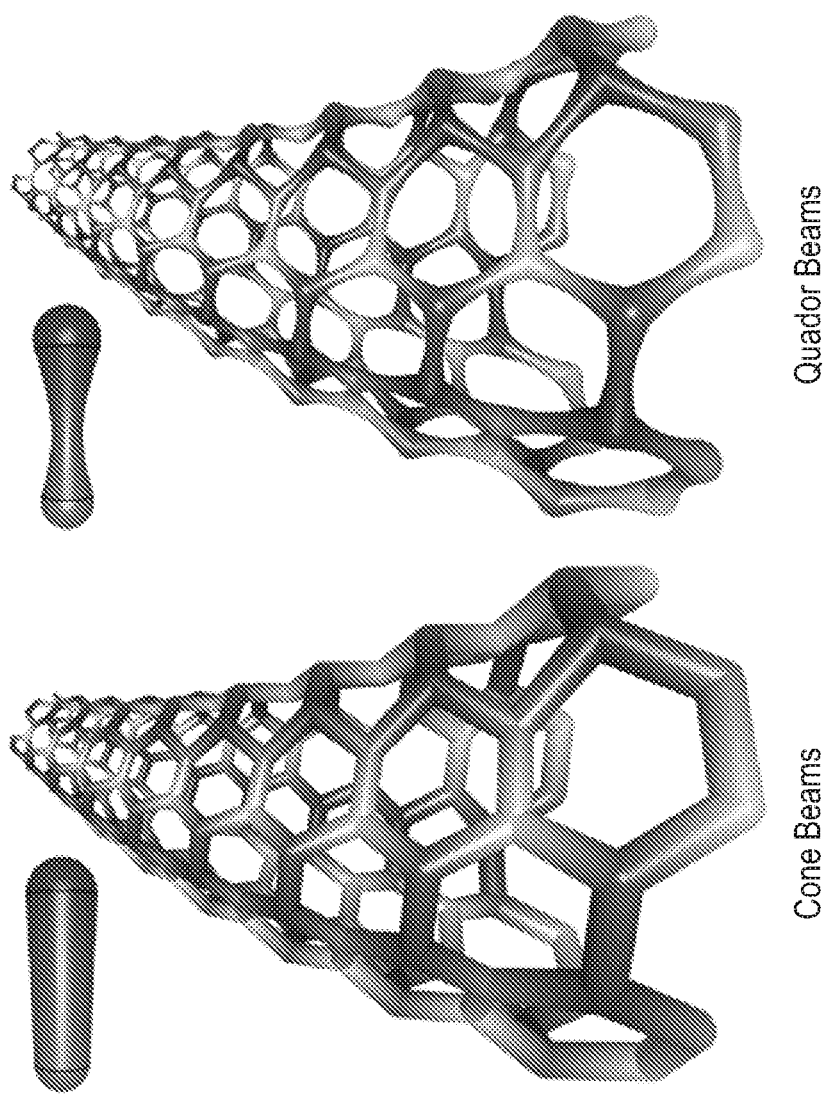
FIG. 1 provides a comparison between a conventional lattice structure defined using cone beams, and a lattice structure defined using quador beams according to the techniques described herein.

To illustrate the differences between the techniques described herein and traditionally lattice generation methods, FIG. 1 provides a comparison between a conventional lattice structure defined using cone beams, and a lattice structure defined using quador beams according to the techniques described herein.

Quador Beam Construction

The surface S that bounds a beam is a surface of revolution that has, as its axis, a straight line, A, that passes through the centers of the two balls that the beam connects. Hence, S is the rotational sweep of some planar "profile" curve C. The plane containing both C and A intersects the two balls at circles $C_1$ and $C_2$. C connects to $C_1$ and $C_2$ with tangential continuity (also referred to as normal continuity). C is invalid if it crosses A. FIG. 2A shows an example hyperbolic profile 205 for a quador beam and an elliptic profile 210 for a quador beam. FIG. 2A also shows example quador beams 215, 220 using the profiles 205, 210 respectively. The sections that follow describe techniques for constructing quador beam construction.

Construction in a Symmetric Frame

As shown in FIG. 2A, the profile of a quador beam is defined by $C_1$ and $C_2$ connected by an axis of symmetry A. We use a coordinate system which places the centers of the circles $C_1$, $C_2$ at coordinates (−1, 0) and (1, 0) respectively. Without loss of generality, we may assume that the radii of the two circles satisfy $r_1 \leq r_3$.

Any conic section curve (ellipse, hyperbola, or parabola) that is symmetric about the x-axis can then be represented by a quadratic equation in the general form:

$$ax^2+y^2+2bx+c=0. \quad (1)$$

We need to find values of a, b, c that will make this curve tangent to the two given circles $C_1$ and $C_2$. Tangency to the two circles will fix only two of these three parameters. So, we let a be a free input variable, for the time being, and we calculate b and c as functions of a. Later, we will replace a by a different free parameter that has a clearer geometric meaning.

To further exploit symmetry, we define $r=(r_2+r_1)/2$ and $d=(r_2-r_1)/2$, i.e. $r_1=r-d$ and $r_2=r+d$. With these definitions, the equations of our two circles become:

$$C_1 : (x+1)^2 + y^2 = (r-d)^2 \qquad (2)$$

$$C_2 : (x-1)^2 + y^2 = (r+d)^2 \qquad (3)$$

To find the points where the general conic intersects circle $C_1$, we eliminate $y^2$ from (1) and (2). This gives us $$ax^2 + 2bx + c = (x+1)^2 - (r-d)^2. \qquad (4)$$

If the conic and circle are tangent, then this equation will have repeated roots, so its discriminant will be zero. So, we equate the discriminant to zero, and solve for c. Then, after substituting $m=a-1$, for brevity, we get:

$$c = \frac{1}{m}[(b-1)^2 - m(r-d)^2 + m]. \qquad (5)$$

Similar reasoning with circle $C_2$ gives:

$$c = \frac{1}{m}[(b+1)^2 - m(r+d)^2 + m]. \qquad (6)$$

We equate the two expressions for c from (5) and (6), and solve for b:

$$b = dmr. \qquad (7)$$

We can substitute this value of b back into either (5) or (6) to get c as a function of m alone:

$$c = \left(1 + \frac{1}{m}\right) + (mr^2 - 1)d^2 - r^2. \qquad (8)$$

If we substitute b from (7) and c from (8) back into (4), we get an equation that we can solve to obtain the x-coordinate of the tangency points on circle $C_1$. Straightforward calculations show that these tangency points $(x_1, y_1)$ are given by:

$$x_1 = -\frac{1}{m}(dmr - 1); \; y_1 = \pm \sqrt{r_1^2 - (x_1 + 1)^2} \qquad (9)$$

Similar computations show that the tangency points $(x_2, y_2)$ on circle $C_2$ are given by $$x_2 = -\frac{1}{m}(dmr + 1); \; y_2 = \pm \sqrt{r_2^2 - (x_2 - 1)^2} \qquad (10)$$

Control by Parameter a

The correspondence between the sign of parameter a and of another parameter $g = b^2/a - c$ was discussed in Jia Jinyuan, Joneja Ajay, Tang Kai. Revolute quadric decomposition of canal surfaces and its applications. In: Computational science—ICCS 2005. 2005. p. 95-104.

However, Jia does not specifically state the minimum and maximum values of a that bound the valid set of profiles. By "valid," we mean a profile that is tangent to the two given circles and produces a singly connected solid of revolution. For example, FIG. 3 shows two invalid profiles. The parameter a (or $m=a-1$) provides an algebraic control of the profile curve, which is not very intuitive. The paragraphs that follow describe a new control parameter that has a clear geometric interpretation and is more intuitive to work with.

Control by Mid-Circle Tangency

Figure 4:
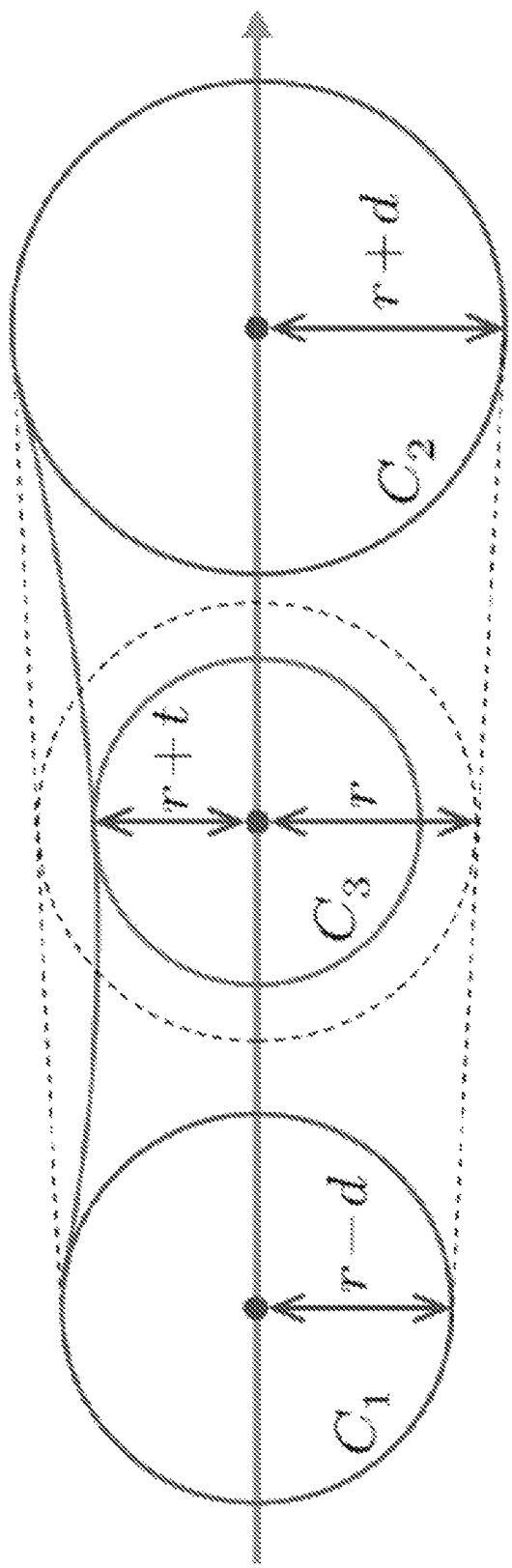
FIG. 4 shows an example of control by mid-circle tangency.

FIG. 4 shows an example of control by mid-circle tangency that may be employed in some embodiments. As shown in FIG. 4, a third circle, $C_3$, centered at the origin is used, and the symmetric conic is tangent to it as well. In other words, $C_3$ is mid-way between the centers of the original two circles $C_1$, $C_2$, so it is in the middle of the beam, in some sense. We denote the radius of this circle by r+t, where t is a "thickening" parameter. If t=0, the conic will be a straight line tangent to all three circles, and the resulting quador will be a cone. Positive values of t make the beam "fatter."

The equation of our third circle, $C_3$, is $x^2 + y^2 = (r+t)^2$. The conic is tangent to the circle $C_3$ if $$m = \frac{1}{d^2 - t^2 - 2rt - 1} \qquad (11)$$

Since $m=a-1$, we can compute a in terms of t and use t as the controlling parameter.

$$a(t) = \frac{d^2 - t^2 - 2rt}{d^2 - t^2 - 2rt - 1} \qquad (12)$$

Valid Values of t

The minimum value of t will correspond to the hourglass shape, and can be computed by equating $a_{min}$ to $a(t)$ from Eq. (12), which considering $r + t_{min} > 0$ gives:

$$t_{min} = d - r. \qquad (13)$$

The max value of t will correspond to the elliptical shape when the profile curve loses tangency with the smaller circle. It can be computed by equating $a_{max}$ to $a(t)$ from Eq. (12). This gives a quadratic in t, and we pick the larger root:

$$t_{max} = -r + \sqrt{d^2 + (r-d)(r+1)}. \qquad (14)$$

Control by Waist Thickness

Observe that neither a, nor t provide a direct control over the min or max cross-section of the beam. This cross-section is referred to herein as the "waist" of the beam and the corresponding beam diameter as waist-thickness ω. For example, observe that even though mid-circle has non-zero radius, the waist-thickness ω is close to zero. We compute waist thickness by writing Eq. (1) in the canonical form, i.e.:

$$\frac{(x - (-b/a))^2}{(b/a)^2 - c/a} + \frac{y^2}{a((b/a)^2 - c/a)} = 1 \qquad (15)$$

We solve for y at $x = -b/a$, and compute waist position and thickness in terms of parameter a:

$$\omega(a) = 2\sqrt{b^2/a - c} \, \text{at} (-b/a, 0). \qquad (16)$$

We can then invert Eq. (16) to express a as a function of ω, but the equations are non-linear. Moreover, the waist can occur outside of the beam. We therefore recommend control by mid-circle tangency, i.e. by parameter t, for which the equations are relatively simple and the results are intuitive.

Biquador Beam Construction

FIG. 5 shows a profile of a biquador beam 505, and a plurality of example biquador beams 510, 515, 520. Again circles, $C_1$ and $C_2$ are defined in the plane, and A is the axis through their centers. The biquador beam is defined using a biconic that is symmetric with respect to A, that is made of two smoothly connected symmetric conic sections and that is tangent to these two circles.

Figure 6:
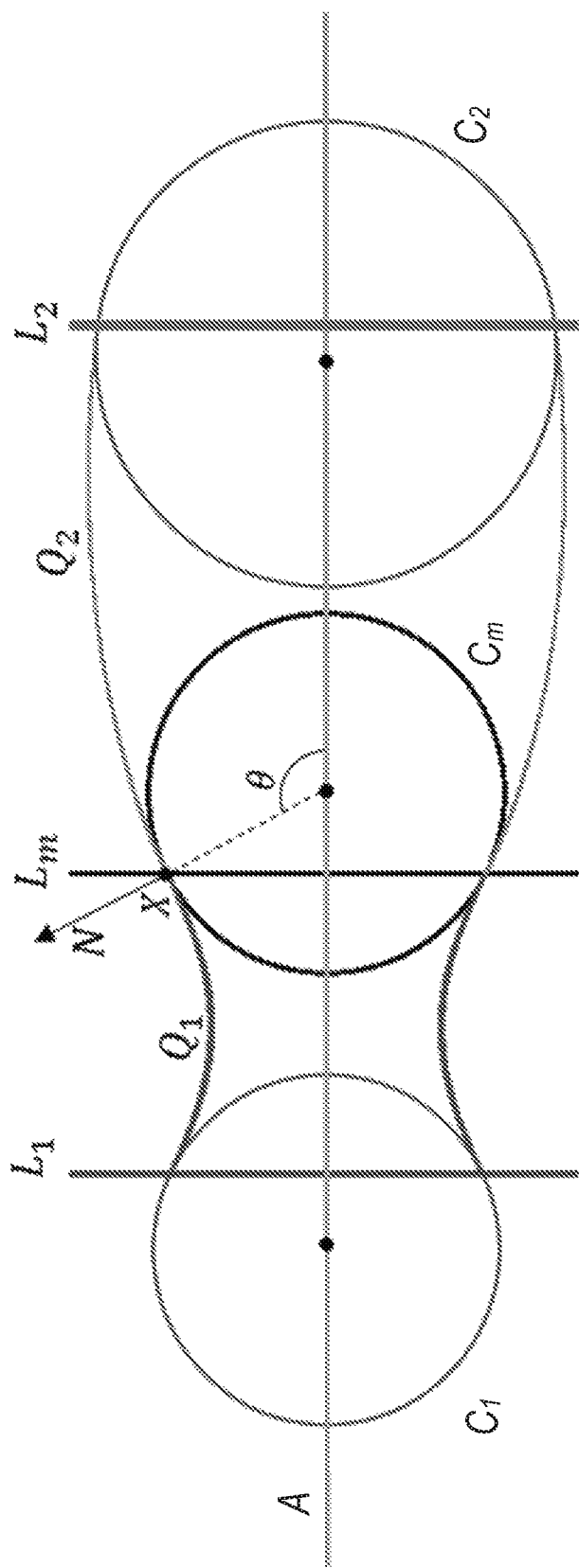
FIG. 6 shows an example of symmetric biconic construction.

FIG. 6 shows a symmetric biconic profile that may be used in some embodiments. This example is defined using conics $Q_1$ and $Q_2$. To relate this solution to the one described in the previous section, we present our solution in terms of a third circle $C_m$ with its center on A, and that is tangent to the biconic at the junction point X between its two conic parts. Let $\theta$ be the angle between the normal N at X and the axis A. One can control the biquador by adjusting the point X and the angle $\theta$.

We reduce the biquador construction to two simpler problems, one on each side of $L_m$. In each sub-problem, we are given an axis A, a circle C (standing either for $C_1$ or for $C_2$) that has radius r, a point X, and a unit normal N. We want a symmetric conic Q that is tangent to C and that passes through X with normal N at X.

We choose the origin to be the center of C and axis A as the x-axis. We compute the equation of each quador as follows. From classical analytic geometry, we know that for any given $\lambda$ the equation:

$$x^2+y^2-r^2+\lambda(x-d)^2=0 \tag{17}$$

represents a conic Q that is tangent to the circle C at the two points where it intersects the vertical line x=d. This conic passes through the given point X=(p, q) if:

$$p^2+q^2-r^2\lambda(p-d)^2=0. \tag{18}$$

We then differentiate Eq. (17) to compute the slopes of the normal to the conic Q. At X, s=tan $\theta$, which gives:

$$s = \frac{q}{d - p(1 + \lambda)}. \tag{19}$$

We then solve the system of Eqs. (18) and (19) to obtain:

$$d = \frac{sq^2 - sr^2 + pq}{q - sp}; \lambda = \frac{q - sp}{s(p - d)}$$

Figure 9:
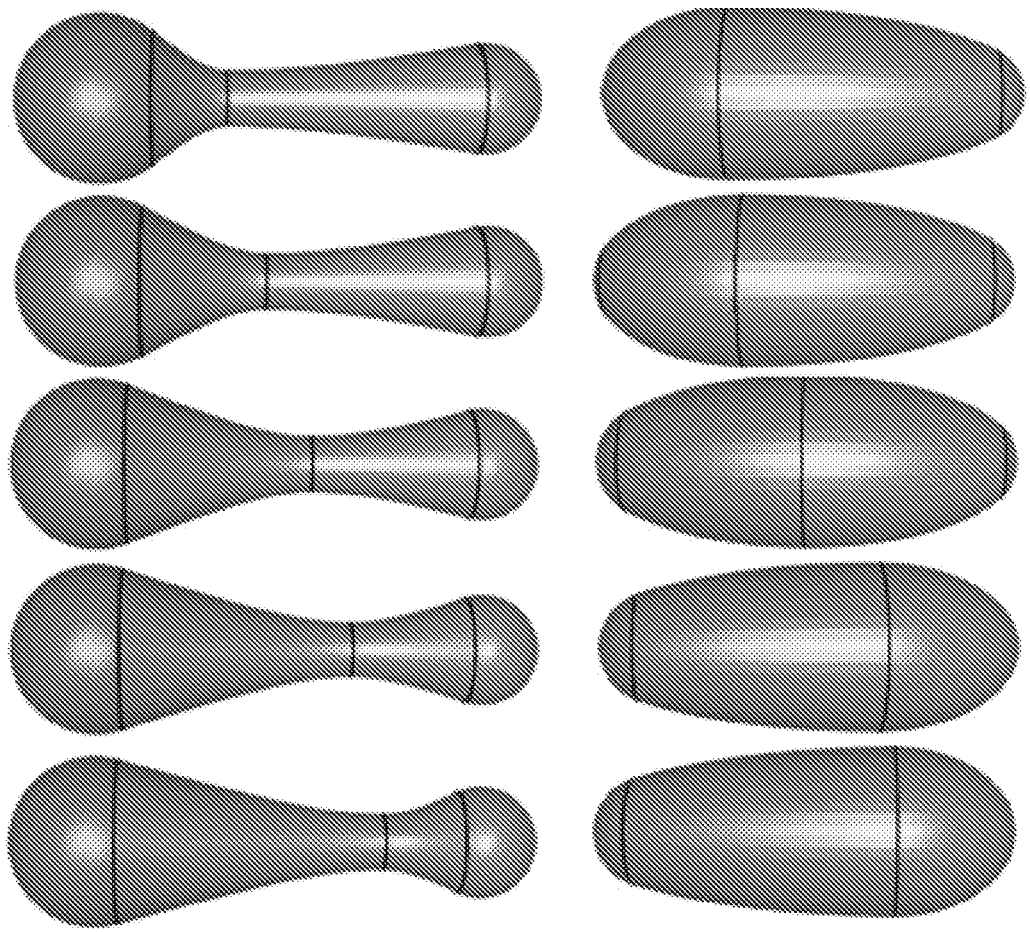
FIG. 9 provides examples of min and max waist biquador families.

FIG. 7 shows examples of symmetric biconics. FIG. 8 shows examples of biquador beams constructed using symmetric biconics. Biquadors make it easier to use waist thickness as a way to control the shape of the beam. For this, we fix $\theta$=90°. Results are shown in FIG. 9. Biquadors make it easier to use waist thickness as a way to control the shape of the beam. For this, $\theta$ may be fixed at 90° in some embodiments of the present invention.

Hub Decomposition of a Clean Lattice

A beam may be divided into two segments referred to herein as "stumps." Each stump includes one of the spheres. Biquador beams are divided at the junction between the two quadors. Quador beams may be divided by a plane normal to the beam axis. For example, the dividing plane may be placed at equal distances from the surface of the two balls of the beam, or at the minimum waist location. Splitting a beam into stumps introduces a cap face in the shape of a disk at the end of each stump.

Figure 10:
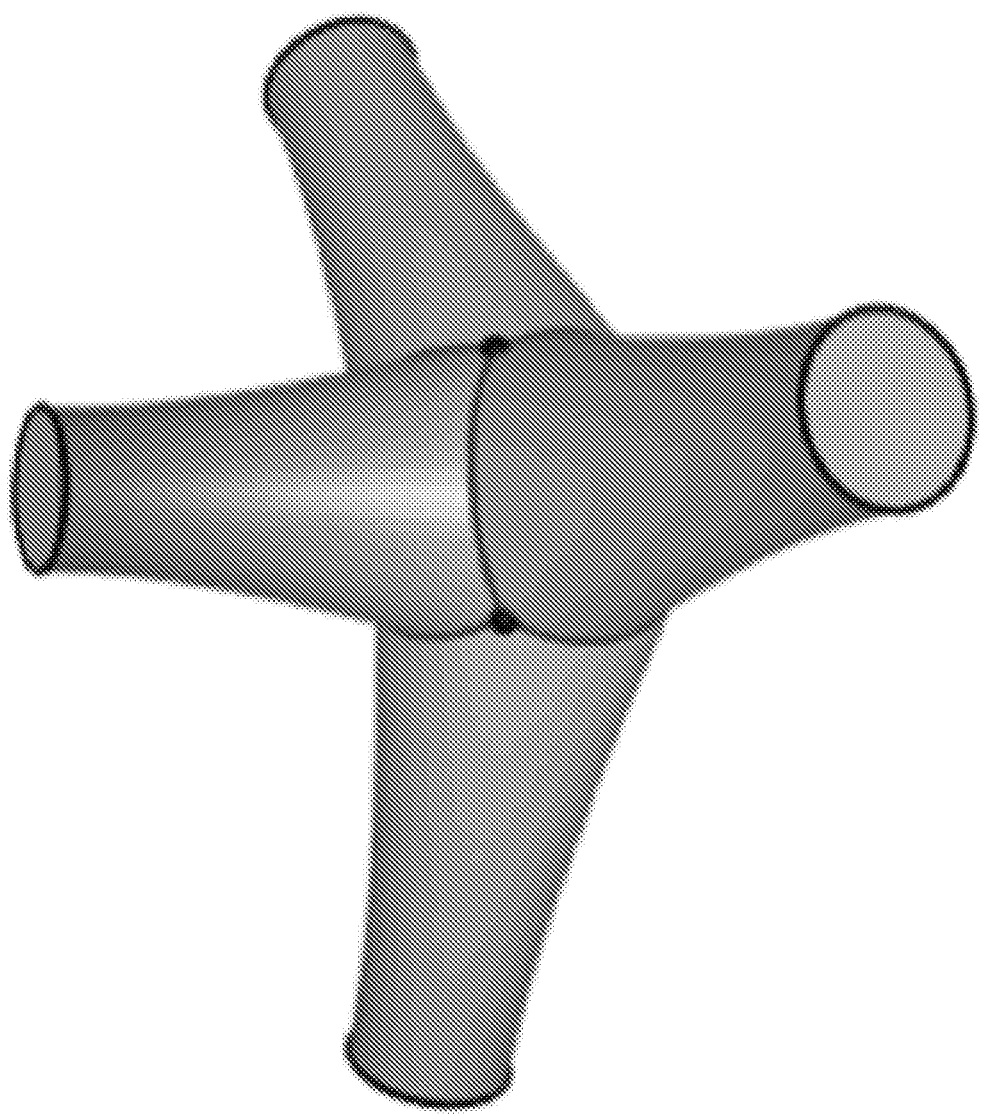
FIG. 10 shows an example hub.

We organize the nodes and stumps of the lattice into an assembly of hubs, each comprising a node and its stumps, which are abutting their node with normal continuity. FIG. 10 shows an example hub. We say that the lattice structure is clean, when the hubs are quasi-disjoint, i.e., when their interiors are disjoint and only stumps of the same beam are in contact at their common cap disk. Typically, architected lattices are intentionally clean, so as to facilitate analysis and optimization. But programmed gradations or warps of regular lattices may produce unclean results.

Intersections of Quadors in a Hub

The intersection of two general quadric surfaces is a space curve of degree 4. Its computation and processing have received much attention in the CAD and Computer Aided Geometric Design (CAGD) communities. However, the intersection curve of any two quadors of a hub is either empty or is a conic section, and hence planar. This fact follows from Salmon's observation in Art. 140 on page 137 of Salmon, George. *A treatise on the analytic geometry of three dimensions,* $7^{th}$ ed., Hodges, Smith, and Company. 1927., where he states that "Two quadrics having plane contact with the same third quadric intersect each other in plane curves." In the case of a hub, the first two quadrics are the curved faces of the stumps and the third quadric is the surface of the -ball of the hub.

Plane of Intersection of Two Quadors

We follow the common convention of using the same symbol to denote a polynomial expression and its zero set. So, for example, the symbol S might denote both the expression S(x, y, z)=$x^2+y^2+z^2-1$, and the spherical surface $\{(x, y, z) \in R^3 : S(x, y, z)=0\}$.

Figure 11:
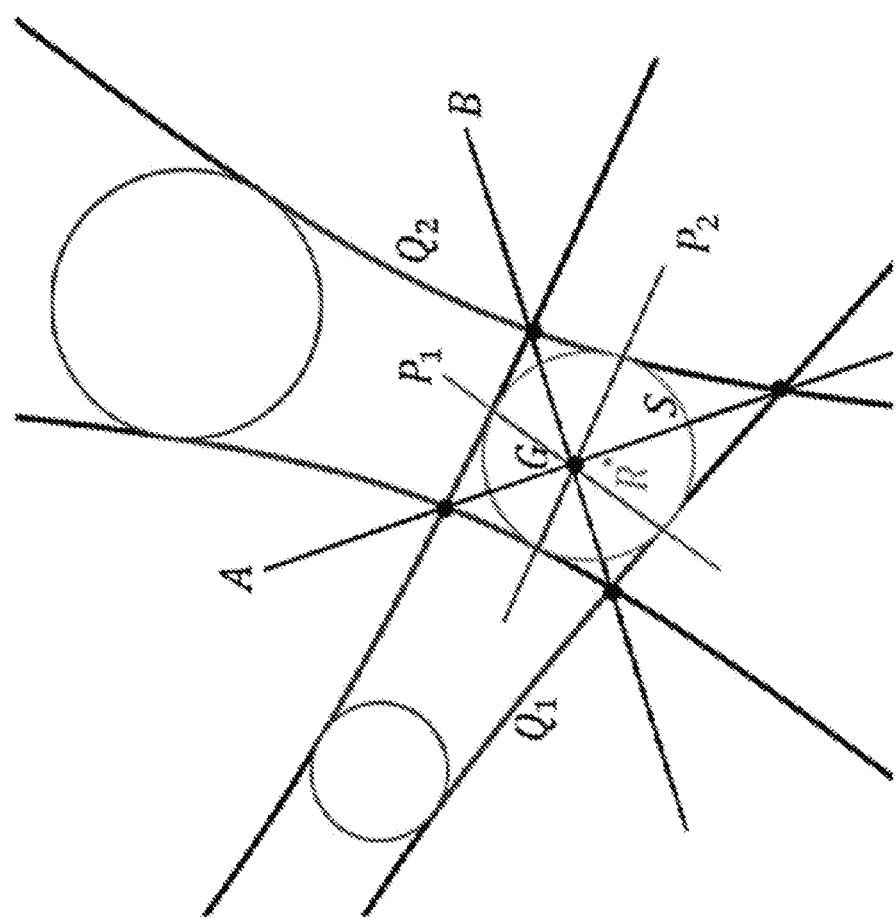
FIG. 11 shows a cross-section of two intersecting quadric surfaces with common inscribed sphere, by a plane that contains their axes.

FIG. 11 shows an example cross-section of two intersecting quadric surfaces with common inscribed sphere, by a plane that contains their axes. Consider the quadric surfaces $Q_1$ and $Q_2$ corresponding to two stumps of a given hub, with the ball S as their common inscribed sphere. For i=1, 2, let $P_i$ be the contact-plane containing the intersection of $Q_i$ and S. There exist real numbers $\lambda_1$ and $\lambda_2$ such that $Q_1=S+\lambda_1 P_1^2$ and $Q_2=S+\lambda_2 P_2^2$ where $Q_1$ and $Q_2$ intersect, we have $Q_1=Q_2$, and so $S+\lambda_1 P_1^2 = S+\lambda_2 P_2^2$. Hence $\lambda^1 P_1^2 - \lambda_2 P_2^2 = 0$, and factorizing gives: $(\sqrt{\lambda_1}P_1 - \sqrt{\lambda_2}P_2)(\sqrt{\lambda_1}P_1 + \sqrt{\lambda_2}P^2) = 0$. In other words, the intersection of $Q_1$ and $Q_2$ is contained within the union of the two planes $$A = \sqrt{\lambda_1}P_1 - \sqrt{\lambda_2}P_2$$

$$B = \sqrt{\lambda_1}P_1 + \sqrt{\lambda_2}P^2 \tag{20}$$

If $\lambda_i$=0, then we have $Q_i$=S, and such cases are of no interest to us. So, we will assume that $\sqrt{\lambda_1}>0$ and $>\sqrt{\lambda_2}>0$.

Let R be the center of sphere S. Using the techniques described above with respect to biquador beam construction, we can find the distance d from R to the plane $P_1$. Then, if U is the unit vector along the axis of $Q_1$ away from R, point R+dU lies on the plane $P_1$. So, the plane $P_1$ includes those points X satisfying the equation RX·U=d. Once $P_1$ is known, we can equate coefficients in the identity $Q_1=S+\lambda_1 P_1^2$ to calculate $\lambda_1$. The plane $P_2$ and the scalar $\lambda_2$ can be obtained by similar reasoning, and then Eq. (20) gives us the desired planes A and B containing the two intersection curves of the entire quadors.

Plane-Quador Intersection Curves

As noted above, the intersection of two quadors of the same hub can be computed by intersecting either of them with a plane. So, in this section, we turn to the problem of intersecting quador Q with plane A.

The intersection of a quador with a plane, may be computed using general techniques that apply to intersection of any surface of revolution with a plane. However, the process may be simplified by taking advantage of the fact that the surface is a quadric-of-revolution. In most cases that occur in lattice geometry, the intersection curve is an ellipse E (see FIG. 12), which may be calculated as follows.

Consider the plane H that is parallel to the axis of the quador Q and is normal to the plane A. Let L be the line of intersection of this plane and the plane A. We intersect L with the quadric Q to obtain two points $F_1$ and $F_2$. These are the end-points of the longer axis of the ellipse E. The center of the ellipse is therefore the point $O=\frac{1}{2}(F_1+F_2)$. Next, we intersect Q with a line through O that is normal to the plane H. The resulting intersection points $N_1$ and $N_2$ are the end-points of the shorter axis of the ellipse. If $I=OF_1$ and $J=ON_1$, then the ellipse has the parametric equation: $E(t)= O+I\cos(t)+J\sin(t)$.

Generalized Brianchon's Theorem

Figure 13:
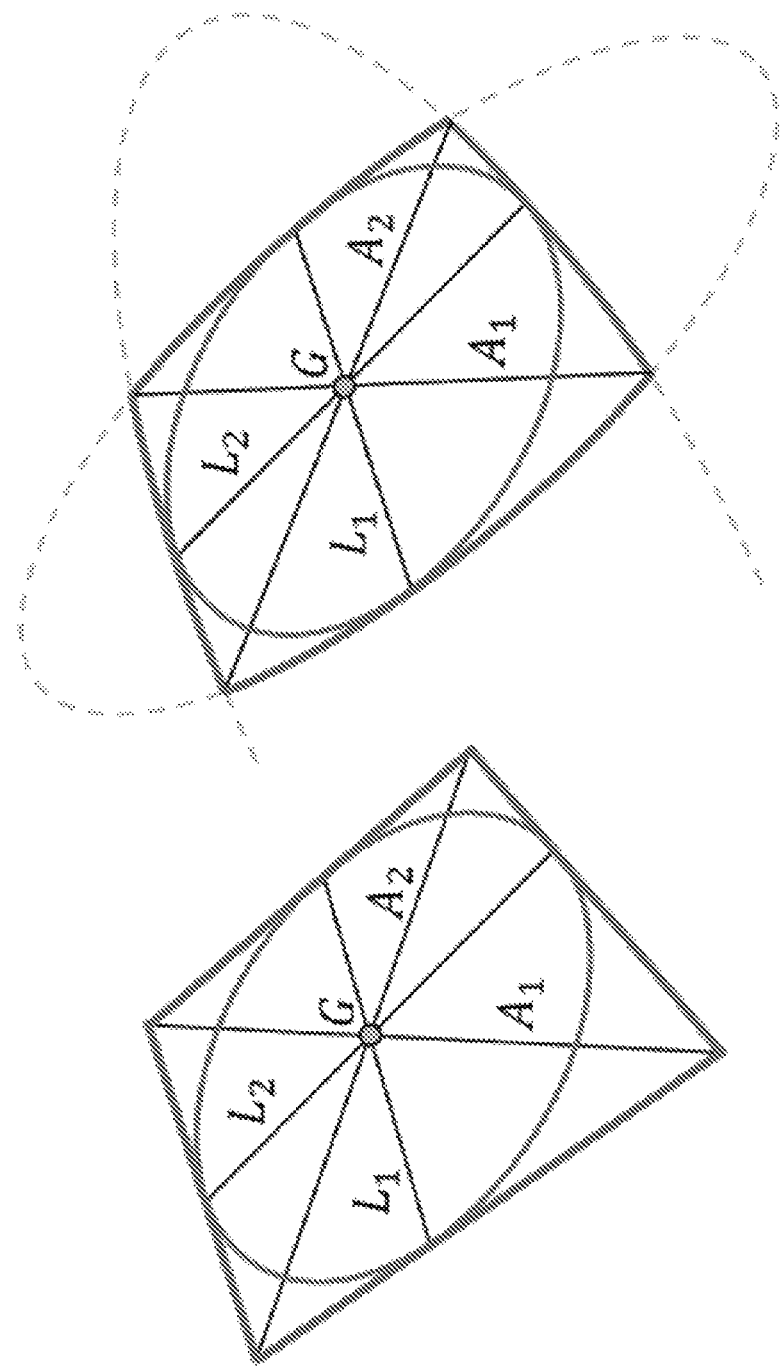
FIG. 13 shows an illustration of Brianchon's theorem and its extension.

The sections below discuss computing the boundary of a hub by trimming quadors with planes. The validity of such trimming hinges upon the special property of conics may be understood as follows. A well-known theorem of Brianchon states that for a quadrilateral with an inscribed conic, the lines connecting the points of tangency on pairs of opposite edges and the two diagonals of the quadrilateral intersect in a common point. A more general result known in the art extends Brianchon's results to the case of a conic quadrilateral, i.e. a quadrilateral whose opposite edges are segments of the same conic. FIG. 13 illustrates Brianchon's original theorem (left) and its extension to conic quadrilaterals (right).

Hub Representations and Processing

In this section, we discuss constructive and explicit representations of the hub and of its boundary, and also their use to support some common queries.

CSG Formulation of a Hub

Figure 14:
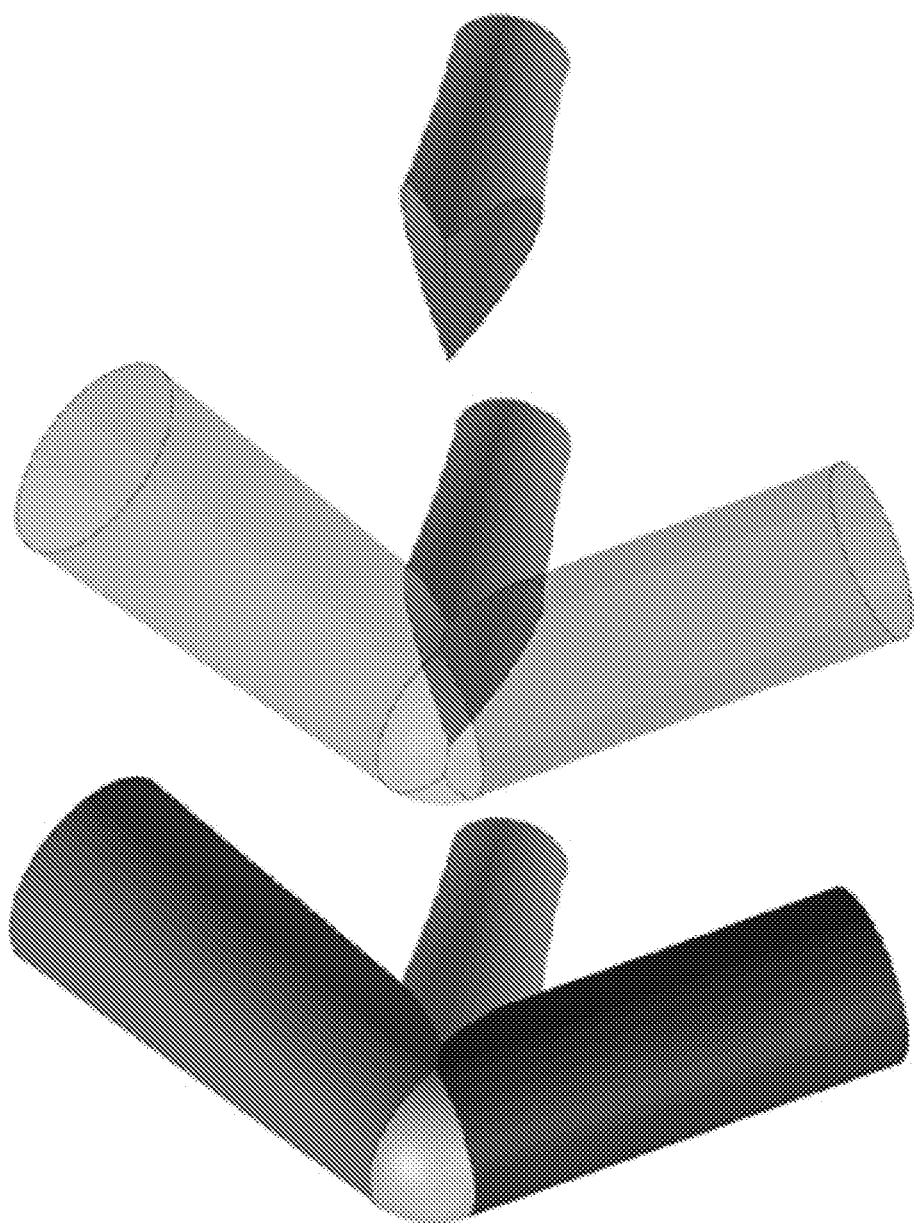
FIG. 14 provides an example of a hub and one of its stumps trimmed by half-spaces.

Each hub has a simple Constructive Solid Geometry (CSG) formulation: it is the union of its ball with its stump primitives, which of course may overlap. Each individual stump primitive, $S_i$, is the intersection of three half-spaces: one quador half-space $Q_i$ and two planar half-spaces, $P_i$ and $E_i$. Half-space $P_i$ is bounded by the contact-plane, containing the contact circle between the quador and the ball. Half-space $E_i$, is bounded by the splitting-plane that we used to cut this stump from the other half of the beam. To illustrate this concept, FIG. 14 shows an example of a hub and one of its stumps trimmed by half-spaces. Note that here again, we are abusing notation and using a symbol, such as $P_i$ to refer, depending on context, to a half-space, to the surface that bounds it, or to a function that is zero for all points on the surface and is negative for all points inside the corresponding half-space.

This CSG representation may be used to support an efficient and precise classification of candidate points, lines, or planes against the hub via the standard divide-and-conquer paradigm, where these candidates are classified against the primitives and the results combined according to the Boolean expression.

Candidate Faces Containing the Boundary of a Hub

The boundary-diminishing property of CSG expressions guarantees that the boundary of a hub is a subset of the boundaries of its primitives. Hence, boundary evaluation of a hub amounts to trimming the faces of its constituent primitives: (1) the sphere that bounds the ball and (2), for each stump $S_i$, the quadric surface $Q_i$ and, if desired, the cap disk in plane $E_i$.

The cap disk in $E_i$ is, in its entirety, a face of the hub in a clean lattice, but does not contribute any two-dimensional portion to the boundary of the lattice, because it lies inside a beam. The cap disk in $P_i$ always lies inside the ball. So the cap-disks need not be trimmed.

However, we do need to trim the spherical and the quador faces, their intersection curves, and the contact circles between the ball and the quadors.

In many contemporary Solid Modeling systems, such a trimming is performed using loops of edges. Sometimes, complex edges are approximated by spline curves defined in the parametric space of each face. This approach is complicated mathematically and numerically fragile; each edge might have 2 or 3 representations that are not geometrically identical, resulting in "cracks." In the case of a hub of a clean lattice, we avoid these problems because we have a simple CSG representation of each hub, and a BRep where all faces and edges have simple mathematical descriptions.

CST of a Hub

Instead of bounding faces by loops of edges, we advocate using, whenever possible, a Constructive Solid Trimming (CST), where each face of the boundary of the hub is defined as the intersection of the corresponding primitive face with a specific solid, represented by a CSG expression. Having CSG expressions for trimming each face allows the classification of candidate points on the untrimmed face. It also makes it possible to use a multi-pass GPU algorithm to render the BRep with pixel accuracy or to obtain images of discretized planar cross-sections.

Various approaches may be used for computing trimming expressions. The sections that follow describe two example approaches: (1) Active Zone and (2) Trimming Polyhedron.

CST Based on the Active Zone

The Active Zone, $Z(A)$, of a primitive A in the CSG expression $E(A, B, C, \ldots)$ of a solid S identifies the point-set where changing A will affect S. Hence, the trimmed version of a face F of primitive A is the intersection $F \cap Z(A)$. In other words, $Z(A)$ is the CST of A. Because the hub is the union of its primitives, the active zone of each primitive is the intersection of the complements of all the other primitives. For example, the CST of the ball is the complement of the union of the CSG formulations of its stumps. If a stump is represented as the intersection of a quador half-space with two linear ones, its complement is the union of their complements.

Trimming Polyhedron of a Quador

We prove below that the portion of the quador surface $Q_i$, that corresponds to a face of the hub is the intersection of $Q_i$ with its Trimming Polyhedron, $T_i$, where $T_i$ is the intersection of a specific set of linear half-spaces.

Hence, instead of the (CSG-based) CST expression discussed above, which involves several quadric surfaces, $T_i$ may be used for queries on $S_i$ including boundary evaluation. Such a formulation has several benefits. First, it simplifies and accelerates CPU and GPU trimming. Second, it provides an exact expression of all the edges of the BRep as portions of conic sections. Third, it provides an exact expression of each vertex of the BRep as the intersection of a quador with a line. These benefits are significant. They hold when the lattice is clean (i.e. hubs are quasi-disjoint).

Figure 15:
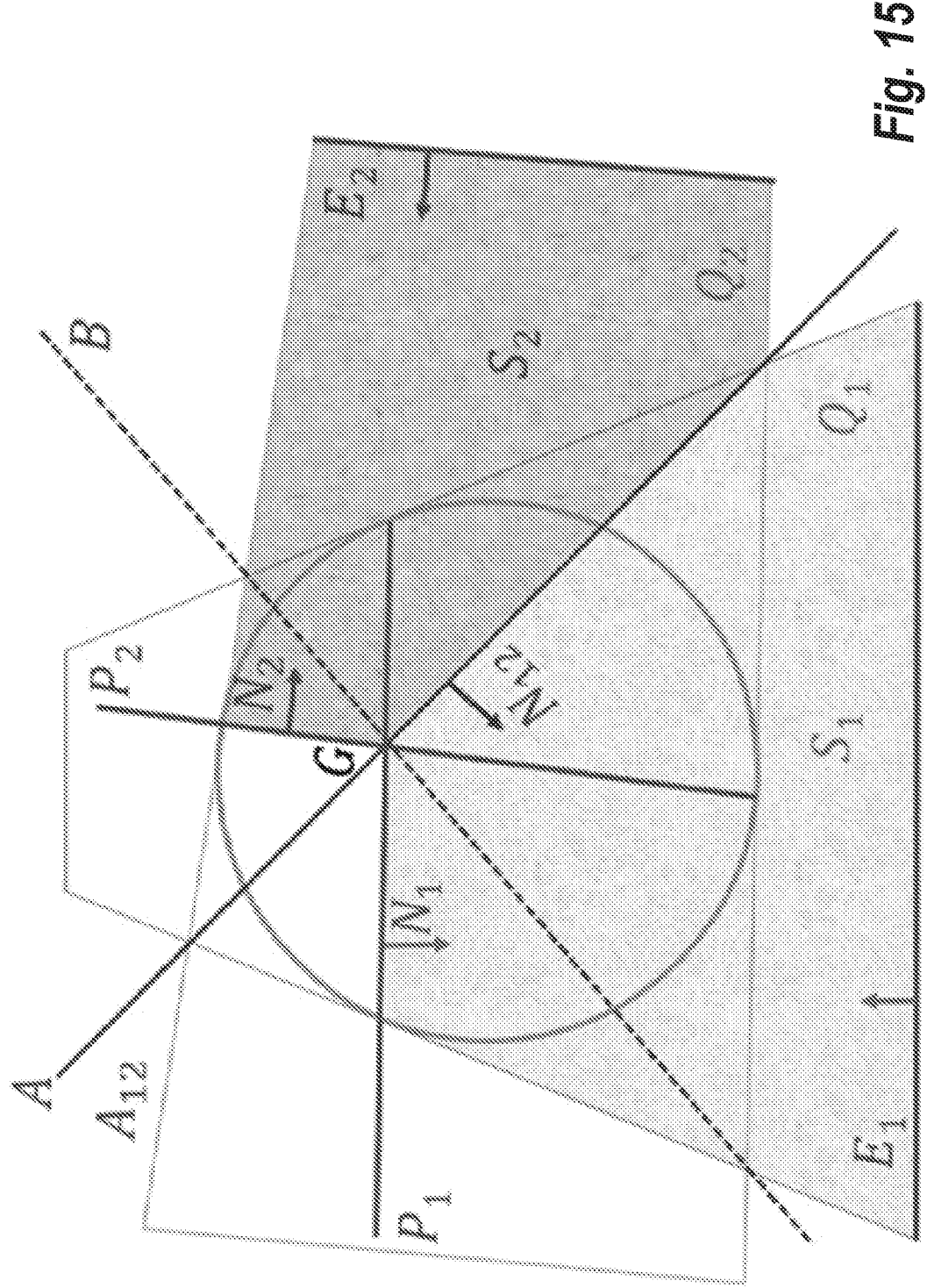
FIG. 15 illustrates an example cross-section of a hub with two stumps.

We have explained already how to compute the planes $P_i$ and $E_i$ that bound stump $S_i$. FIG. 15 shows the cross-section of a hub with two stumps, $S_1$ and $S_2$. Their trimmed portions (the shaded regions). The contact planes $P_1$ and $P_2$, and the corresponding half-spaces, are indicated by the inward normal vector. Planes A and B are the intersection-planes. Half-space $A_{12}$ is oriented to contain the trimmed version of $S_1$.

We have also explained how to compute the intersection-planes, A and B, (Eq. (20)), the union of which contains the intersection curve between stumps $S_i$ and $S_j$. Below, we prove that the intersection curve lies on plane A and propose a simple expression for the trimming polyhedron.

The normal of plane $E_i$ is oriented such that the corresponding half-space $E_i$ contains the center of the ball of the hub. Normal to plane $P_i$ has the opposite direction. For clarity, we use $A_{ij}$ to denote the half-space bounded by plane A, whose normal is oriented such that its corresponding half-space $A_{ij}$ contains the active zone of primitive $S_i$ in the CSG formulation of the hub.

Theorem. The trimming polyhedron, $T_i$, of a stump $S_i$ is the intersection of a specific set of linear half-spaces: $P_i$, $E_i$, and the half-spaces $A_{ij}$ for all $j \neq i$.

Note that some of these half-spaces may be redundant in the CST of stump $S_i$. They can be identified, as such, through a straightforward process. Doing so may accelerate subsequent processing.

Intersection-Plane Between Quadors

We now prove that the intersection curve of two stumps is contained in plane A and not in the plane B of Eq. (20). Consider the configurations of the two contact-planes $P_1$ and $P_2$ in FIG. 15. We can orient the normals of the planes $P_1$ and $P_2$ so that each half-space $H_i = \{x: P_i(x) \geq 0\}$ contains the corresponding stump. Then the intersection curve, C, lies in the wedge-shaped region $H_1 \cap H_2$. Note that $P_1$, $P_2$, A and B are concurrent at G. Now, if we take a point x in the interior of C, then $P_1(x) > 0$ and $P_2(x) > 0$. By definition, we have $B(x) = \sqrt{\lambda_1} P_1(x) + \sqrt{\lambda_2} P_2(x)$, where $\sqrt{\lambda_1} > 0$ and $\sqrt{\lambda_2} > 0$, so $B(x) > 0$, and hence $x \notin B$. This shows that C is not contained in B, so it must be contained in A. We orient the normal to plane A, such that the corresponding half-space $A_{ij}$ contains the center of the other ball of the quador beam corresponding to stump $S_i$. In fact, the normal defined by Eq. (20) provides the correct orientation.

Trimming the Intersection Curves

The conic section curve, C, along which the boundaries of $S_i$ and $S_j$ intersect, lies on plane A. To trim C to the extent that is on the boundary of the hub, we need to compute its intersection with a modified version of the trimming polyhedron CST of stump $S_i$, from which we have removed the half-space $A_{ij}$.

A simple way of doing this trimming is to parameterize C, to compute parameter intervals defining the portion of C in each half-space of the modified CST, and to return the intersection of these intervals. The computation of the parameter interval for a given half-space, H, of the modified CST amounts to computing the intersection of C with a line L, where A and H intersect. Note that the trimmed version of C may have several connected components, each being a different edge of the hub.

Trimming the Sphere

Figure 16:
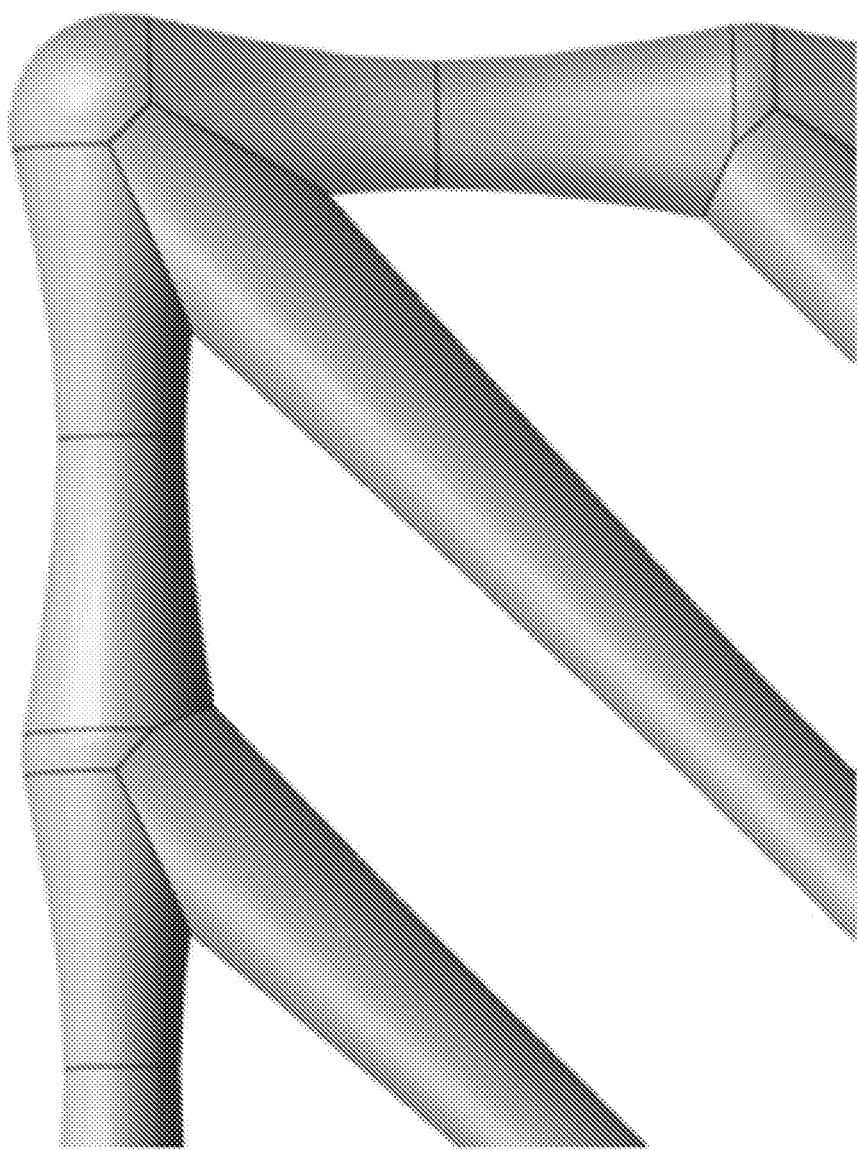
FIG. 16 shows example faces and edges in a clean lattice.
Figure 17:
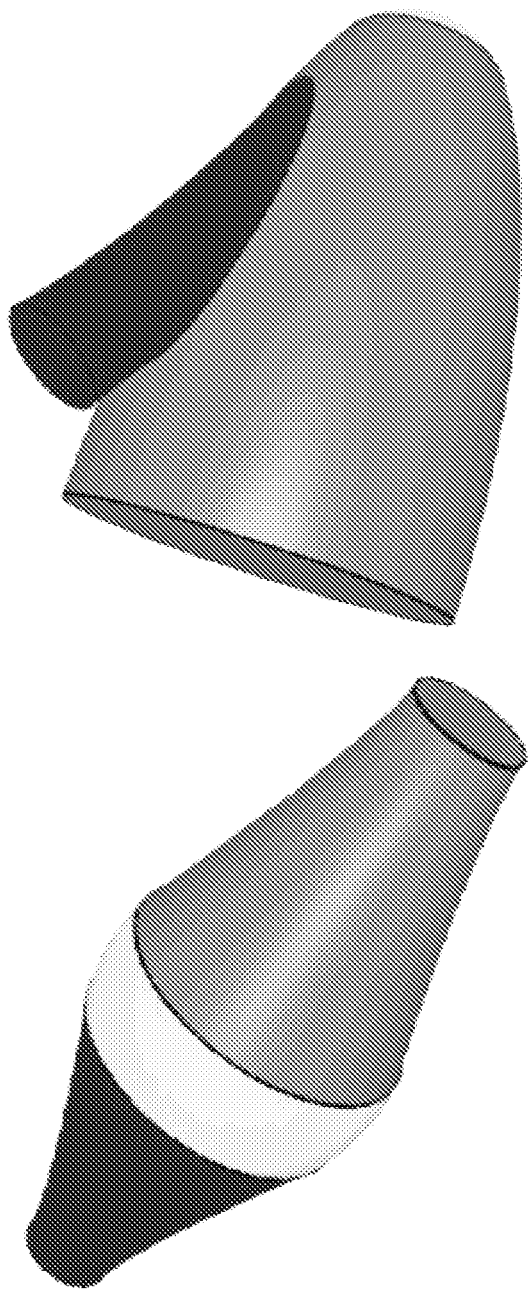
FIG. 17 shows edge loops in a hub.

The polyhedral CST for sphere S is the intersection of the complements of the contact half-spaces, $P_i$, of its stumps. Hence, its trimmed face is bounded by circular arcs of tangential contact with the quadors (as shown in FIG. 16). It may have more than one connected component. It may have closed-loop edges with no vertices (as shown in FIG. 17).

Engineering Benefits of Quador Beams

In previous sections, we have shown that the computational complexity of quador beams is no worse than cylinder or cone beams. However, from an engineering perspective, lattices constructed from quador beams have some significant advantages, which are described in this section.

In order to increase their strength-to-weight ratio, micro lattices are often optimized by varying the diameters of their nodes and beams. If a lattice has cylindrical beams, then the tangency condition that we have used means that all beams and all nodes will have the same diameter, so there is only a single variable that can be used in editing and optimization. Freedom can be increased by relaxing the tangency condition, but then beam/beam intersections become much more complex, and it is impossible to derive any computational benefit from the properties discussed herein.

For lattices with cone beams and with tangent node/beam junctions, thickness gradation can be achieved by changing the diameters of the nodes. This implicitly fixes the diameters of the beams. In particular, all beams that end at a given node must have the same end-diameter. With this approach, it is impossible to make beam thickness dependent on the beam orientation, which restricts opportunities for optimization.

Figure 18:
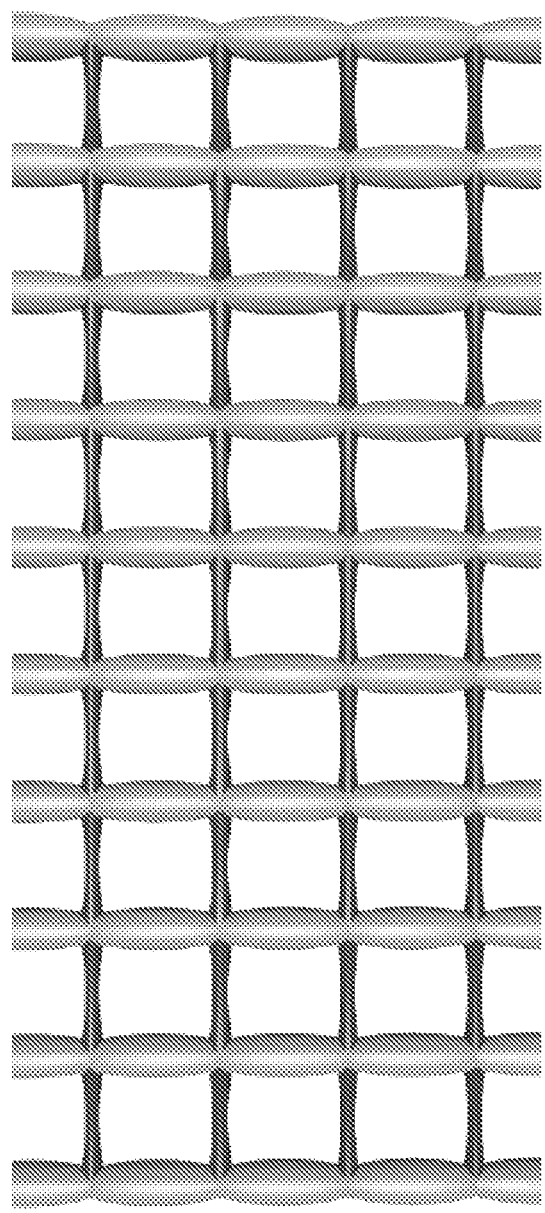
FIG. 18 illustrates varying beam diameters in a lattice structure.

In lattices with quador, biquador or multi-quador beams, beam diameters can be controlled independently of node diameters. For example, with quador beams, the thickening parameter t discussed above can be used as one of the design variables. The increased freedom does not adversely affect the complexity of the geometry at lattice nodes, while it provides a larger design space for optimization, better results can be achieved. For example, if a lattice is supporting a load, it is quite likely that an optimal design will have thin horizontal beams and thicker vertical ones. This is possible with quador beams, but not with conical ones as shown in FIG. 18. Moreover, the parametric representation of the beams allows local or global control of size and shape. Additionally, the elegant formulation simplifies blending and hollowing of beams during lattice construction.

When optimizing a quador lattice, all of the individual node and beam diameters are potentially available for use as independent variables. However, a complex lattice may have billions of nodes and beams, so using individual diameters would give us far more variables than a typical optimization process could handle. A better approach is to use field functions to define node and beam diameters. So, for example, we might have two real-valued functions $f_N$ and $f_B$ that give us the node and beam diameters at any point in the lattice in terms of a few dozen design parameters. These parameters would be used as the independent variables in optimization processes, not the individual node and beam diameters. Additionally, it should be noted that the curved profiles discussed herein provide additional freedom to design topologically optimized structure.

Another advantage of using quador or biquador beams over cylinder or cone beams is that one can significantly vary the ratio of their surface area to volume. For example, the area/volume ratio of the quador beam in FIG. 19 is roughly 1.5× that of the cone beam, even though their nodes are the same size. This is important when designing lattices for applications where surface area is important, such as those involving convection, fluid flow, and adsorption. Additionally, the smoothly connected surfaces improve stress distribution. Hence, we expect that profiled beams may have benefits for structural performance, fluid dynamics, or heat transfer.

Microlattices are also optimized by designing them as hierarchical or multilevel structures, essentially replacing each ball or beam of the lattice with a lattice and so on. We expect that quador, biquador, and multi-quadors may be useful at the coarsest level, i.e. level 1 to support overall aesthetics or functional design goals, at level 2 to support optimization that adjusts the thickness of individual beams while ensuring hub validity, and at the level 3 to help to redistribute mass.

Figure 20:
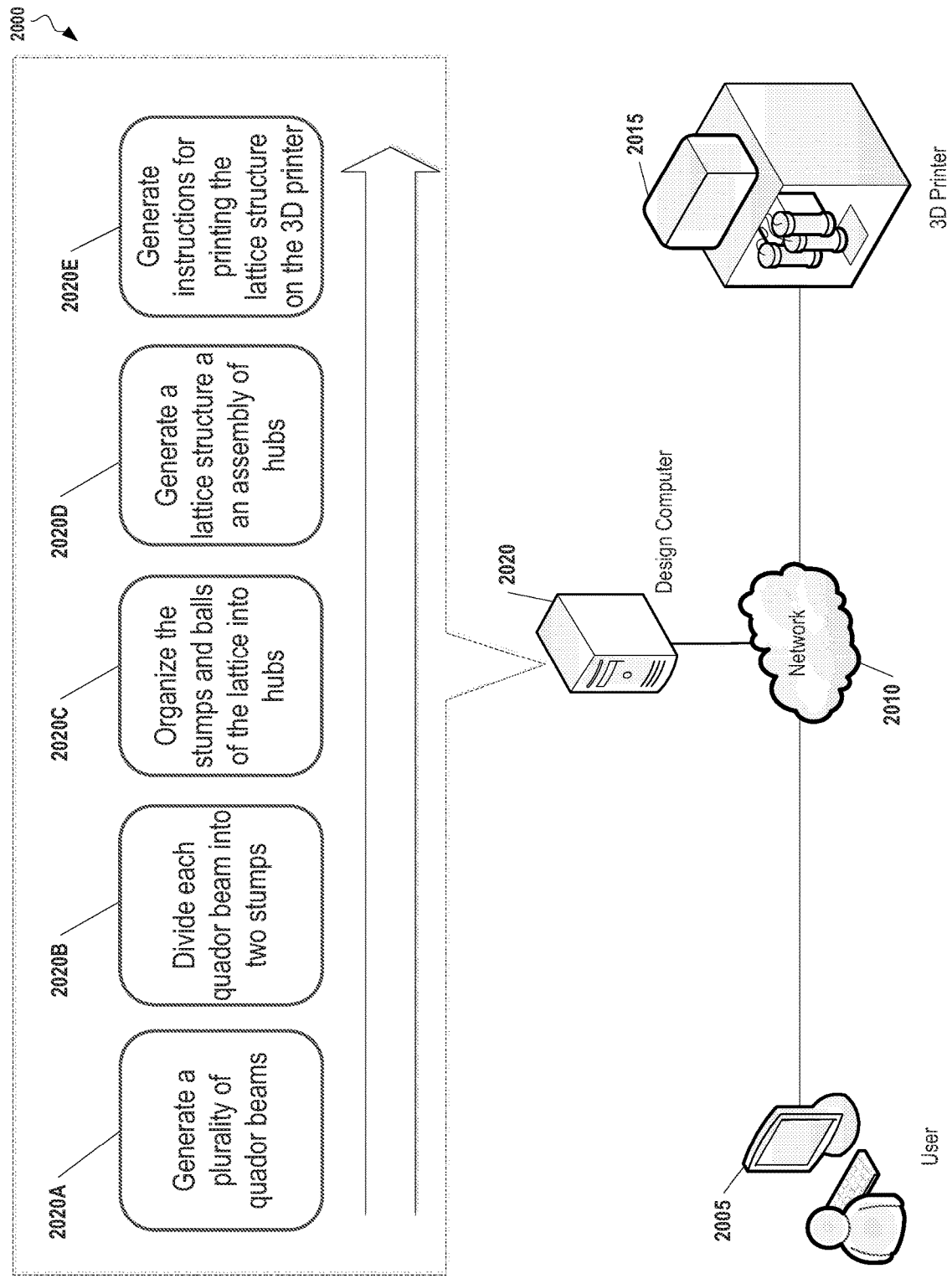
FIG. 20 illustrates a system for constructing lattice structures for architected materials, according to some embodiments.

FIG. 20 illustrates a system 2000 for constructing lattice structures for architected materials, according to some embodiments of the present invention. This example is directed at the generation and use of quadors; however, a similar system may be employed for bi-quadric or other types of multi-quador beams. A User Computer 2005 is connected to a Design Computer 2020 over a Network 2010. The Design Computer 2020 in this example provides a CAD tool as a cloud-based tool. It should be noted that the architecture of the system 2000 is merely exemplary and other system architectures can be used in different embodiments. For example, in some embodiments, the Design Computer 2020 is the User Computer 2020 (i.e., the User Computer 2020 runs the CAD tool).

The Design Computer 2020 executes a series of steps 2020A-2020E to generate a set of instructions for a 3D Printer 2015 to print a lattice. At step 2020A, a plurality of quador beams are generated within the CAD tool. For example, in some embodiments, the quador is a primitive within the CAD tool. Each quador beam comprises two spheres at opposing endpoints of the quador beam and each quador beam is bounded by a quadric surface of revolution around an axis of symmetry joining the center of the two spheres. The exact details of how each quador beam is designed can vary according to different embodiments using the techniques described above. For example, in some embodiments, the quador beams vary in length. In other embodiments, the two spheres included in each quador beam are defined with different radius values.

Next, each quador beam is divided into two stumps at step 2020B. In some embodiments, each quador beam is divided by a dividing plane normal to the quador beam. In other embodiments, the dividing plane is placed at equal distance from the two balls of the quador beam. Each stump comprises one of the two spheres included in the quador beam. At step 2020C, the Design Computer 2020 organizes the stumps and the balls of the lattice, into a plurality of hubs. Each hub comprises a plurality of stumps intersecting in a plane along a conic curve. The Design Computer 2020 generates a lattice structure as an assembly of the hubs at step 2020D. Finally, at step 2020E, instructions are generated for printing the lattice structure on the 3D Printer 2015. Techniques for translating 3D models to programming instructions for a 3D printer are generally known in the art, and such techniques are often dependent on the type of printer being employed. Thus, the techniques for translating the lattice structure to printing instructions are not discussed in detail herein This computer network 2010 may be configured using a variety of hardware platforms. For example, the computer network 2010 may be implemented using the IEEE 802.3 (Ethernet) or IEEE 802.11 (wireless) networking technologies, either separately or in combination. In addition, the computer network 2010 may be implemented with a variety of communication tools including, for example, TCP/IP suite of protocols. In some embodiments, the computer network 2010 is the Internet. A virtual private network (VPN) may be used to extend a private network across the computer network 2010.

This 3-D Printer 2015 may generally be any three-dimensional printer generally known in the art. Additionally, in some embodiments, hybrid devices such as the big area additive manufacturing machines (BAMM) may be used which combine 3-D printing with computer numerical control (CNC) routing. Moreover, the general techniques presented in FIG. 20 may be extended to specialized printers. For example, in some embodiments, the object of interest is a replacement organ and the 3-D Printer 2015 is a bio-printer. As is understood in the art, a bio-printer uses additive manufacturing techniques to deposit living cell material in layers whose thickness depends on the tissue being printed. Once the 3-D Printer 2015 has completed printing the organ, the tissues are stored in an incubator referred to as a "bio-reactor." While in the bio-reactor, the tissues mature in preparation of use in the patient's body. It should be noted that, in some embodiments, a specialized bio-printer may be used to print directly in the patient's body. In this case, the printed tissue can mature directly in the patient's body and incubation in the bio-reactor can be omitted.

Figure 21:
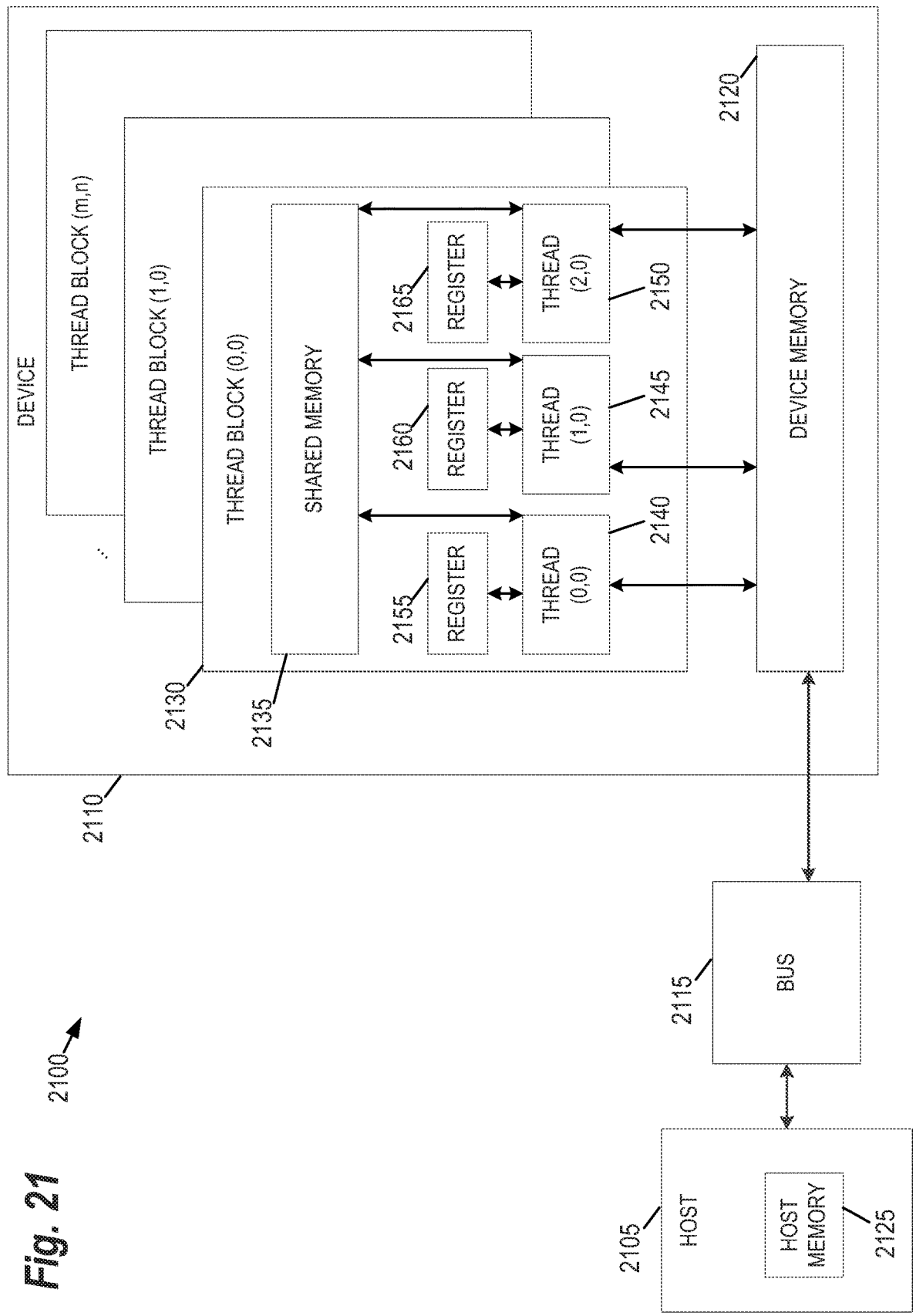
FIG. 21 is a block diagram of a parallel processing memory architecture that may be utilized to perform computations relating to the generation or rendering of Quador or Multi-Quador beams according to aspects of embodiments described in this disclosure.

FIG. 21 provides an example of a parallel processing memory architecture 2100 that may be utilized to perform computations related to the generation and rendering of quador and multi-quador beams within design tools, according to some embodiments of the present invention. This architecture 2100 may be used in embodiments of the present invention where NVIDIA™ CUDA (or a similar parallel computing platform) is used. The architecture includes a host computing unit ("host") 2105 and a GPU device ("device") 2110 connected via a bus 2115 (e.g., a PCIe bus). The host 2105 includes the central processing unit, or "CPU" (not shown in FIG. 21) and host memory 2125 accessible to the CPU. The device 2110 includes the graphics processing unit (GPU) and its associated memory 2120, referred to herein as device memory. The device memory 2120 may include various types of memory, each optimized for different memory usages. For example, in some embodiments, the device memory includes global memory, constant memory, and texture memory.

Parallel portions of a deep learning application may be executed on the architecture 2100 as "device kernels" or simply "kernels." A kernel comprises parameterized code configured to perform a particular function. The parallel computing platform is configured to execute these kernels in an optimal manner across the architecture 2100 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 2100 of FIG. 21 (or similar architectures) may be used to parallelize generation of lattice structures. For example, in some embodiments, rendering of different sections of the lattice structure may be performed in parallel and later merged to produce the full structure.

The device 2110 includes one or more thread blocks 2130 which represent the computation unit of the device 2110. The term thread block refers to a group of threads that can cooperate via shared memory and synchronize their execution to coordinate memory accesses. For example, in FIG. 21, threads 2140, 2145 and 2150 operate in thread block 2130 and access shared memory 2135. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 21, the thread blocks 2130 are organized in a two-dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of different regions of the lattice may be partitioned over thread blocks automatically by the parallel computing platform software.

Continuing with reference to FIG. 21, registers 2155, 2160, and 2165 represent the fast memory available to thread block 2130. Each register is only accessible by a single thread. Thus, for example, register 2155 may only be accessed by thread 2140. Conversely, shared memory is allocated per thread block, so all threads in the block have access to the same shared memory. Thus, shared memory 2135 is designed to be accessed, in parallel, by each thread 2140, 2145, and 2150 in thread block 2130. Threads can access data in shared memory 2135 loaded from device memory 2120 by other threads within the same thread block (e.g., thread block 2130). The device memory 2120 is accessed by all blocks of the grid and may be implemented by using, for example, Dynamic Random-Access Memory (DRAM).

Each thread can have one or more levels of memory access. For example, in the architecture 2100 of FIG. 21, each thread may have three levels of memory access. First, each thread 2140, 2145, 2150, can read and write to its corresponding registers 2155, 2160, and 2165. Registers provide the fastest memory access to threads because there are no synchronization issues and the register is generally located close to a multiprocessor executing the thread. Second, each thread 2140, 2145, 2150 in thread block 2130, may read and write data to the shared memory 2135 corresponding to that block 2130. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 2110 to read and/or write to the device memory. Device memory requires the longest time to access because access must be synchronized across the thread blocks operating on the device. Thus, in some embodiments, the processing of each subgraph is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 21, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program codes for providing and facilitating the mechanisms of the embodiments of the present disclosure. The article of manufacture can be included as part of a computer system or sold separately.

Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) the element is expressly recited using the phrase "means for."

We claim:

1. A computer-implemented method for constructing structures using beams bounded by quadric surfaces of revolution, the method comprising:
generating a quador beam within a computer-aided design (CAD) tool, wherein:
(i) the quador beam comprises two spheres at opposing endpoints,
(ii) the quador beam is bounded by a quadric surface of revolution around an axis of symmetry joining a center of the two spheres, and
(iii) the quadric surface of revolution abuts with tangent continuity with a surface of each of the spheres; and
displaying a visualization of the quador beam.

2. The method of claim 1, wherein the quadric surface of revolution is defined by a profile curve and an axis of revolution passing through the center of the spheres.

3. The method of claim 2, wherein the profile curve is a straight line or conic curve having an axis of symmetry coincident with the axis of symmetry of the quador beam.

4. The method of claim 1, wherein a shape of the quador beam is controlled by a radius of a third sphere placed between the two spheres and the quadric surface of revolution is tangent to the third sphere.

5. The method of claim 1, wherein a shape of each quador beam is controlled by a waist thickness parameter defined as a maximum or minimum diameter of a cross-section of the quador beam across a length of the quador beam.

6. A computer-implemented method for constructing structures using beams bounded by quadric surfaces of revolution, the method comprising:
generating a plurality of quador beams within a computer-aided design (CAD) tool, wherein:
(i) each quador beam comprises two spheres at opposing endpoints,
(ii) each quador beam is bounded by a quadric surface of revolution around an axis of symmetry joining a center of the two spheres, and
(iii) the quadric surface of revolution of each quador beam abuts with tangent continuity with a surface of each of the spheres;
constructing a lattice from a set of balls and the plurality of quador beams, wherein each quador beam connects an arbitrary pair of the balls; and
displaying a visualization of the lattice.

7. The method of claim 6, wherein, to construct the lattice, each quador beam of the lattice is split into two stumps by a splitting plane normal to the axis of symmetry of the quador beam.

8. The method of claim 7, wherein the splitting plane passes through a point on the axis of symmetry of the quador beam which is at an equal distance from the surface of the two spheres of the quador beam.

9. The method of claim 7, wherein the splitting plane passes through a point on the axis of symmetry of the quador beam where the quador beam has a minimum or maximum thickness.

10. The method of claim 7, wherein the lattice comprises a plurality of hubs and each hub comprises a union of a ball included in the set of balls and one or more stumps.

11. The method of claim 10, wherein the lattice is constructed in a manner that allows an exact computation of a boundary representation of each hub comprising faces, edges, and vertices bounding the hub.

12. The method of claim 11, wherein the faces of the boundary representation are defined as an intersection of a portion of a quador beam with a trimming polyhedron specified as an intersection of a specific set of linear half-spaces.

13. The method of claim 11, wherein (a) each stump of the hub comprises a quador surface defined as a portion of the quadric surface of revolution remaining on the stump after splitting the quador beam and (b) the edges of the boundary representation are defined as an intersection of the spherical surface of a ball of the hub or the quador surface of a stump of the hub by a plane.

14. The method of claim 11, wherein (a) each stump of the hub comprises a quador surface defined as a portion of the quadric surface of revolution remaining on the stump after splitting the quador beam and (b) the vertices of the boundary representation are defined as intersection of a line with a spherical surface of the ball or the quador surface of a stump of the hub.

15. The method of claim 10, wherein the lattice is represented as an assembly of its hubs.

16. A computer-implemented method for constructing structures using beams bounded by a series of quadric surfaces of revolution, the method comprising:
generating a multi-quador beam within a computer-aided design (CAD) tool, wherein:
(i) the multi-quador beam comprises two spheres at opposing endpoints,
(ii) the multi-quador beam is bounded by a plurality of quadric surfaces of revolution around an axis of symmetry joining a center of the two spheres,
(iii) a surface of a first sphere abuts with tangent continuity with a first surface in the series of quador surfaces and a second sphere abuts with tangent continuity with a last surface in the series of quador surfaces and
(iv) the plurality of quadric surfaces of revolution are smoothly connected with tangent continuity within each multi-quador beam; and
displaying a visualization of the multi-quador beam.

17. The method of claim 16, wherein each of the quadric surfaces of revolution are defined by a profile curve and an axis of revolution passing through a center of the two spheres.

18. The method of claim 17, wherein the profile curve is a straight line or conic curve having an axis of symmetry coincident with the axis of symmetry of the multi-quador beam.

19. The method of claim 16, wherein a series of intermediate balls are introduced between the two spheres at opposing endpoints, such that the two quador surfaces, one on either side an intermediate ball connects tangentially to each other and to the intermediate ball in a single contact plane.

20. The method of claim 16, wherein the shape of a multi-quador beam is controlled by a radius, a position of center on beam's axis, and a position of contact-plane, of any of the intermediate balls of the beam.

* * * * *